United States Patent [19]

Larson et al.

[11] 4,072,206
[45] Feb. 7, 1978

[54] DEVICE FOR REGULATING VEHICLE ROAD SPEED

[75] Inventors: Gerald L. Larson, Battle Creek, Mich.; Alberto Pi, New Orleans, La.; Martin W. Uitvlugt, Battle Creek, Mich.

[73] Assignee: Eaton Corporation, Cleveland, Ohio

[21] Appl. No.: 671,539

[22] Filed: Mar. 29, 1976

Related U.S. Application Data

[63] Continuation of Ser. No. 469,568, May 13, 1974, abandoned.

[51] Int. Cl.$^2$ ............................................. B60K 31/00
[52] U.S. Cl. ................................ 180/105 E; 123/102; 180/108; 180/109; 180/110; 361/242
[58] Field of Search ................ 180/105 E, 108, 105 R, 180/106, 107, 109, 110; 123/102; 361/242

[56] References Cited

U.S. PATENT DOCUMENTS

| | | | |
|---|---|---|---|
| 3,298,482 | 1/1967 | Mueller | 123/102 X |
| 3,319,733 | 5/1967 | Rath | 123/102 X |
| 3,381,771 | 5/1968 | Granger | 180/108 X |
| 3,405,779 | 10/1968 | Johnston | 180/108 |
| 3,410,362 | 11/1968 | Fales | 123/102 X |
| 3,444,950 | 5/1969 | Uitvlugt | 180/105 R |
| 3,599,154 | 8/1971 | Carol | 180/105 E X |
| 3,715,006 | 2/1973 | Walsh | 180/105 E |
| 3,722,614 | 3/1973 | Sakakibara | 180/105 E |
| 3,869,019 | 3/1975 | Cardani | 180/105 E |

*Primary Examiner*—Joseph F. Peters, Jr.
*Assistant Examiner*—John P. Silverstrim
*Attorney, Agent, or Firm*—Teagno & Toddy

[57] ABSTRACT

A motor vehicle speed control system which, upon activation by the vehicle operator, maintains the vehicle at a predetermined set speed. The system utilizes a duty-cycle type pneumatic servoactuator responsive to an electrical control signal for controlling movement of the vehicle throttle. Control means responsive to deviation of vehicle speed from the predetermined set speed, is operable to vary the control signal characteristics in accordance with a predetermined governing equation and the electrical control signal is utilized to operate the servoactuator. Vehicle speed is sensed by a generator providing an electrical signal output and a control means is of the electronic type responsive to the electrical speed signal and the predetermined set speed. In one embodiment both analog-digital circuit techniques are employed for the control means and, in another embodiment, substantially all-digital circuitry is utilized.

10 Claims, 21 Drawing Figures

DEVICE FOR REGULATING VEHICLE ROAD SPEED

This is a Continuation of application Ser. No. 469,568, filed May 13, 1974 (now abandoned).

BACKGROUND OF THE INVENTION

In the art of motor vehicle speed regulators or cruise controls as they are often referred to, it is common practice to compare a vehicle speed signal with a predetermined, or set speed, signal to provide a control signal for operating an actuator connected to the vehicle throttle. One technique, known in the art is that of providing a rotating flyweight speed sensor to control the position of a vacuum valve in response to changes in vehicle speed. In vehicle speed regulators using this technique, the vacuum valve controls the vacuum in a chamber, and the chamber vacuum is then applied to an actuator bellows or diaphragm, motion of which is translated through intermediate linkages to the vehicle throttle. As the vacuum valve moves in response to movement of the flyweight speed sensor, the chamber vacuum is varied to cause differing amounts of movement to the diaphragm actuator. When the vehicle speed regulator of this type system is not in use, the flyweight governor is not actively coupled to the vacuum control valve. Upon activation of the system by the vehicle operator, the flyweight governor is clutched, for example, electrically to the vacuum control valve to thereafter control movement of the control valve in a manner proportional to the movement of the flyweight governor. The flyweight governor is usually driven by the vehicle speedometer cable drive. An example of this type of speed control system is set forth in U.S. Pat. No. 3,298,482.

Systems of the above-described type rely upon the mechanical motion of the flyweight sensor to provide the vehicle speed signal input. The flyweight sensor typically requires a rotary mechanical connection to the vehicle wheel; for example, to the transmission driven speedometer drive cable. In order to eliminate this rotary mechanical connection, it has been desired to produce an all-electrical speed regulator.

It is known in the art to provide an electrical speed regulator where the vehicle speed signal is provided by a wheel driven tachometer generator, attached, for example, to the vehicle drive train or transmission. The signal from the tachometer generator is then electrically compared with a signal corresponding to the desired operator selected set speed. The comparison of these electrical speed signals is then used to drive a servomotor for moving the vehicle throttle in a manner so as to maintain the vehicle speed within a desired degree of agreement with the operator selected set speed.

With either of the above-described systems for controlling vehicle speed the throttle actuator, connected to the vehicle throttle, is caused to move the throttle by an amount proportional to the control signal which moves in accordance with the difference between the vehicle speed and the desired speed. Such an arrangement tends to cause the vehicle to change speed too rapidly in response to a large throttle change, and thus causes the vehicle to overshoot the set speed and create a difference in the opposite sense. For example, if the system calls for a great increase in throttle opening in response to a large difference between vehicle speed and set speed, drastic acceleration of the vehicle may cause the vehicle to increase in speed well above the set speed before the system can change the control signal for varying the throttle position. Thus, it has been found necessary to provide some means of modifying the control signal or its effects to prevent the vehicle from "hunting" or oscillating about the set speed. One technique which has been used is set forth in U.S. Pat. No. 3,298,482, mentioned above, where the position of the throttle is applied by feedback means to change the bias on the valve member in a manner so as to counteract the efforts of the flyweight governor to move the valve member to produce a greater vacuum in the chamber for controlling the actuator. Another technique which has also been used, is described in U.S. Pat. No. 3,575,256, wherein the throttle position is sensed by a transducer providing an electrical signal, which electrical signal is applied to electrical means comparing vehicle speed with set speed for producing the control signal. In this type speed regulator the position of the throttle affects the electrical control signal applied to the servoactuator.

Where it has been found desirable to provide a vehicle speed control having all electrical means for sensing and comparing speed signals and for providing a control signal, it has been found extremely difficult to duplicate the throttle position feedback attenuating feature provided in the all-mechanical system. Although the above-described electrical system provides a throttle position feedback signal, it is used to modify the electric control signal to the servoactuator. Unfortunately, providing feedback modification or attenuation to the control signal generator for the servoactuator does not insure linear response of the combination of servoactuator and vehicle engine throttle, and therefore oscillation about the set speed occurs.

In the construction of the conventional vehicle throttle, the carburetor throttle mechanism has nonlinear return biasing, with respect to motion of the throttle actuating linkage, in order to give a linear throttle-power response from the engine. A servoactuator operating against nonlinear throttle actuator systems and which attempts to apply a linearly controlled response force to the throttle, produces the overall nonlinear vehicle response known as "hunting" wherein the vehicle speed is caused to oscillate about the set speed. In order to minimize the characteristic of the system known as "hunting", it has been found necessary to provide some means of directly damping or attenuating the movement of the throttle servoactuator as the vehicle approaches the set speed.

SUMMARY OF THE PRESENT INVENTION

The present invention provides a solution to the above-described problem and incorporates a novel and unique vehicle speed control system of the type wherein a throttle servoactuator is governed by a fluid pressure control signal generated by sensing and comparing vehicle speed with a predetermined set speed by novel electrical techniques utilizing a governing equation and includes means for mechanically variably biasing the control signal generator for attenuation of throttle movement as the vehicle approaches the set speed.

The speed control of the present invention employs means alternating from an activating to a deactivating state for producing a fluid pressure control signal for controlling movement of the throttle actuator. The alternating means is preferably a fluid pressure valve having a vibrating flapper. The present invention includes means for generating an electrical signal representative of vehicle speed. Electrical control means is responsive to the vehicle speed signal, and is operable to provide a control signal which varies the time (during each period of alternation) said alternating means is in said actuating state in accordance with a governing equation for thereby controlling vehicle speed. Means is also provided for variably biasing the alternating member to the deactivating state during each cycle of alternation in response to movement of the vehicle throttle. The variable biasing means and the control means cooperate to effect the period of alternating means. The method includes generating a control signal having one characteristic varied in accordance with a governing equation and supplying such signal to a servoactuator for controlling throttle movement.

The system of the present invention utilizes a generator driven by the vehicle power train, usually the speedometer drive gearing, to provide the vehicle speed signal. The control means is of the all-electrical type and, in one embodiment, utilizes analog-digital techniques and, in another embodiment, substantially all-digital circuitry, to compare the output of the tachometer generator with a preselected stored set speed signal to produce a novel electrical control signal.

The electronic circuitry performs a calculation in accordance with a predetermined system governing equation based on "set" speed and instantaneous vehicle speed sensed by the circuitry and provides an electrical control signal for controlling movement of the alternating vacuum flapper valve. The control signal is preferably a series of width modulated electrical pulses. Upon each actuation of the vehicle operator's "SET" switch for selecting the desired speed, or actuation of the "RESUME" switch after braking for returing to the desired speed, the electrical control signal has an initial predetermined value, or pulse width, for causing an initial duty cycle of the alternating flapper for a duration substantially longer than the normal control signal duty cycle. After the initial duty cycle pulse, the control signal continues normal control modulation in accordance with the governing equation. The valve flapper alternates between a position closing a vacuum port and another position opening the vacuum port and closing an atmospheric vent port to a vacuum chamber. The electrical control signal is applied to means for varying the time in which the alternating means or flapper is in a position opening the vacuum port or closing the atmospheric vent port. The alternating means thus controls the vacuum in the chamber which is, in turn, applied to a throttle position actuator.

The vacuum flapper valve is variably biased to the deactivating state or position closing the vacuum port to the chamber, and mechanical means are provided to vary the flapper valve bias in response to the position of the vehicle throttle. The present invention thus provides a vehicle speed control system which has a high degree of control sensitivity response which is the result of electrical speed sensing and control signal generating techniques utilizing a control signal generated in accordance with a governing equation and yet one which employs the necessary function of mechanical dampening, or attenuation, of the throttle actuator as the vehicle approaches "set" speed to thereby prevent oscillation about the set speed due to over-control of the vehicle by the throttle actuator.

DETAILED DESCRIPTION

Figure 1:
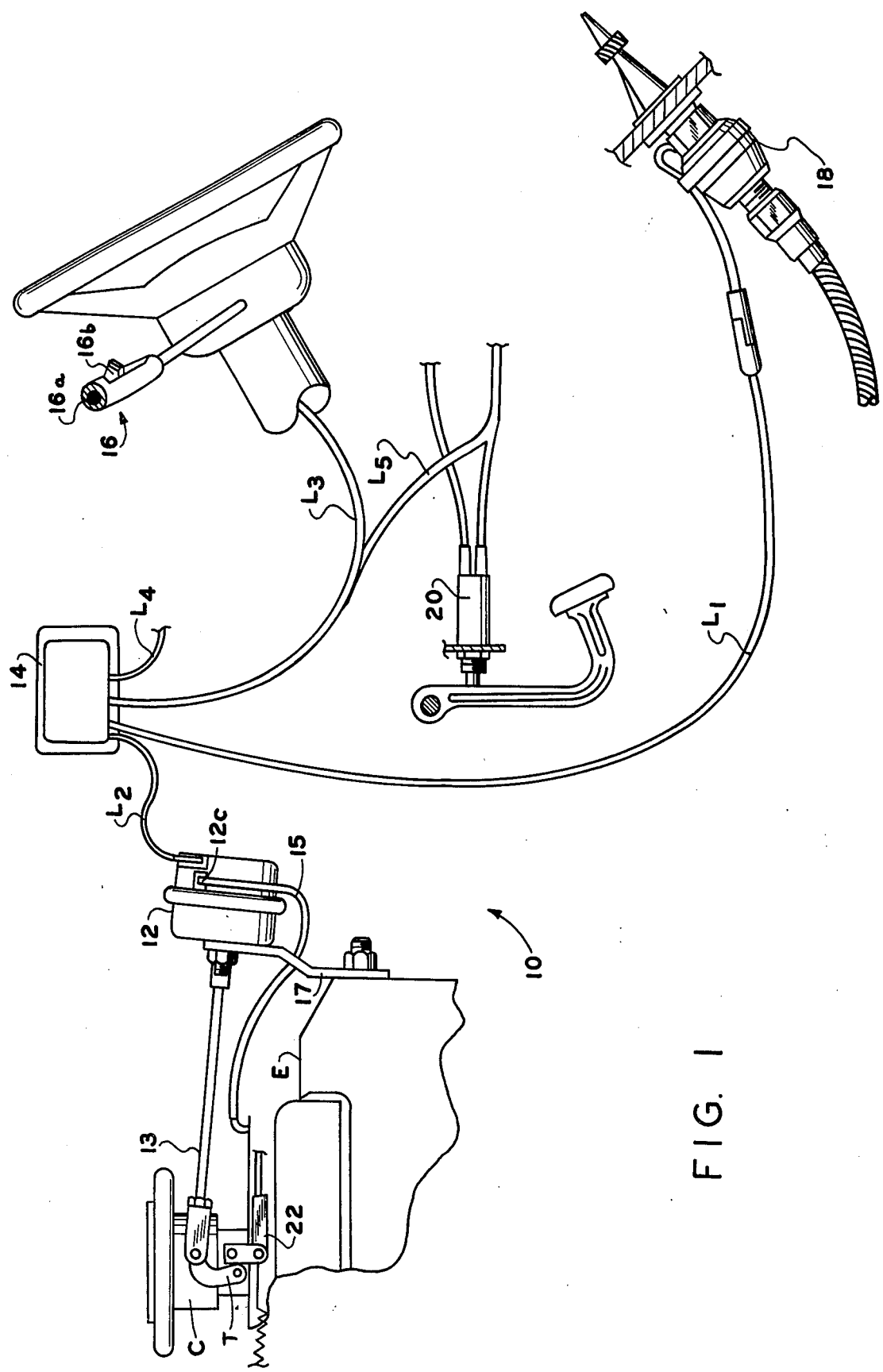
FIG. 1 is a pictorial diagram of the preferred form of the vehicle speed regulator system and illustrates the installation of the system components on a vehicle.

Referring now to FIG. 1, the speed control system 10 of the present invention is illustrated pictorially as it is typically installed in a motor vehicle having an engine E with carburetor C and throttle T. The system 10 includes a servoactuator 12, preferably mounted to the engine E with a throttle control rod 13 connected from the servoactuator 12 to the throttle T for movement thereof. The system 10 includes an electronic control circuitry package in housing 14 which may be conveniently mounted within the vehicle engine compartment as, for example, on the firewall. A fluid pressure line 15 from a source of fluid pressure as, for example, the intake manifold of the engine E, is connected to a vacuum inlet port 12c on servoactuator 12.

A vehicle speed generating means in the form of a tachometer generator 18 is provided, typically mounted on the vehicle transmission to be driven by the conventional drive gear, thereby eliminating the usual flexible rotary cable connection to the system 10. An electrical lead L1 is connected from the tachometer generator 18 to an electrical input connection provided in housing 14. A second electrical cable L2 connects the output of the electrical control signal circuitry and brake-disable circuitry through an appropriate connector in housing 14 to the servoactuator 12.

Vehicle operator control switches, indicated generally at 16, are provided conveniently disposed on the vehicle turn signal lever extending from the steering column. The switch control 16 includes a "set" switch button 16a and a "resume" switch slide lever 16b, the operation of which will be set forth hereinafter in detail. An electrical cable L3 carries individual leads (not shown) from the switches 16a and 16b down the steering column and through the firewall to separate inputs of the electronic circuitry through housing 14. A separate electrical lead L4 provides power to the electronic circuitry from a fused connection to the vehicle ignition switch (not shown). A separate electrical lead L5 connects the vehicle brake stoplight switch 20 electrically in series with an interrupt or servo-disabling circuit provided within the housing 14. When the vehicle operator depresses the brake pedal and the vehicle brake light switch is actuated, lead L5 provides an electrical current to a servo-disabling circuit in the housing 14 as will be hereinafter described in detail with reference to the electrical circuitry.

The system is initially placed in operation by the vehicle operator depressing SET button 16a on the turn signal lever which "SETS" the instantaneous speed of the vehicle in the system's electrical memory. Upon releasing the button 16a, the control signal generator within the housing 14 is activated to operate the servoactuator and thereafter regulate the vehicle speed about the particular "SET" speed. If driving conditions should require application of the vehicle brakes while the system 10 is in operation, upon completing the braking function and release of the brake pedal, the vehicle operator need only move slide switch 16b outwardly toward the end of the turn signal lever to activate the "RESUME" function which, as will be hereinafter discussed in detail, causes the system to again take control and accelerate the vehicle to, and maintain, the SET speed at which the vehicle was under control at the time the brakes were applied.

Briefly, the operation of the system is such that, upon activation of SET button 16a, the electrical circuitry stores the SET speed and continuously compares the SET speed with the running speed signal from the tachometer generator 18 and provides a control signal through leads L2 to the servoactuator. The servoactuator contains an alternating means, preferably in the form of an oscillating flapper vacuum control valve which generates a control vacuum within a chamber in the actuator. The control vacuum operates a diaphragm attached to the throttle control rod 13 for movement of the vehicle throttle T. The individual components of the system 10 and their operation will now be described in greater detail with reference to the accompanying drawings.

VEHICLE SPEED SENSOR

As mentioned above, vehicle speed is sensed by a wheel driven, preferably transmission mounted, tachometer generator 18 which provides a continuously alternating electrical signal having frequency proportional to the vehicle speed. The tachometer generator may be of any construction known in the art which lends itself to convenient mounting on the speedometer cable drive connection provided on the vehicle transmission. It has been found convenient to use a tachometer generator having an internal impedance of approximately 40 ohms resistive, and inductive reactance of 20 millihenries. The electrical output of the tachometer generator 18 provides a signal having an amplitude in the range of 0.5 – 12 volts. The presently preferred tachometer generator has an output of 12 volts peak-to-peak full-scale and intermediate output of one volt for each ten miles per hour (10 m.p.h.) of vehicle speed. Full-scale output is taken as a shaft speed for the tachometer generator corresponding to 120 mile per hour vehicle speed. Preferably, the signal output of the tachometer generator has a frequency falling within the range of from 2 – 16 hertz per mile per hour vehicle speed, and preferably a frequency of 2.222 hertz per mile per hour vehicle speed. It will be apparent that the particular choice of full-scale voltage of the tachometer generator and frequency of the signal will be determined by the characteristics of the particular circuitry utilized; however, the above signal characteristics have been found to be the most convenient and practical for automotive applications.

SERVOACTUATOR

Figure 3:
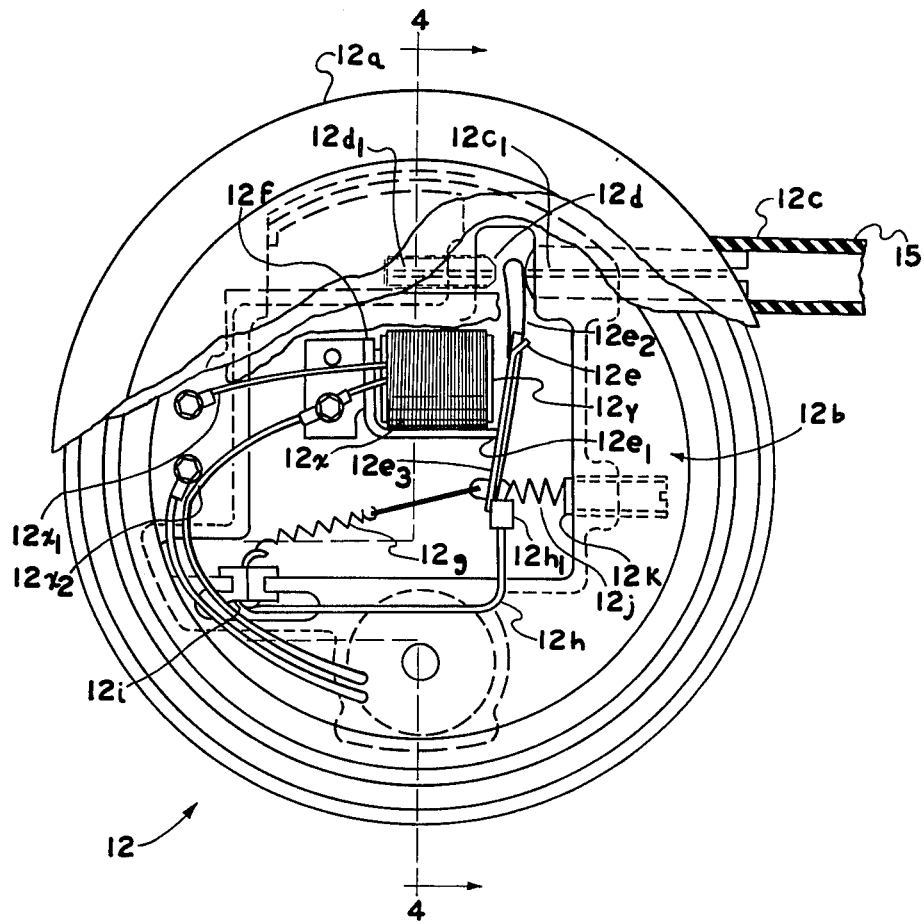
FIG. 3 is a plan view of the servoactuator of the system of FIG. 1 with portions of the cover-housing thereof broken away to expose the interior components.
Figure 4:
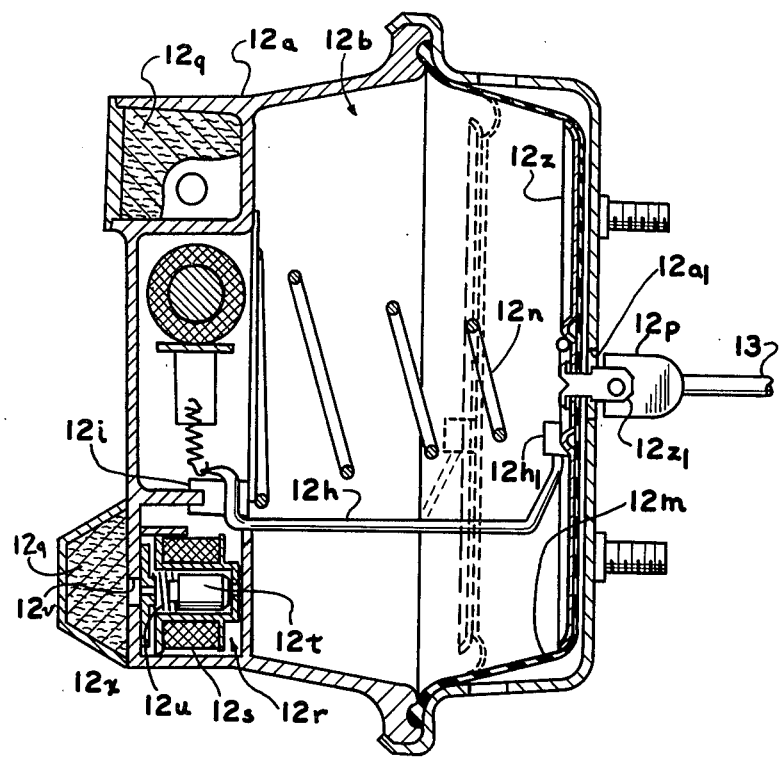
FIG. 4 is a section view taken along section indicating lines 4—4 of FIG. 3.

Referring now to FIGS. 1, 3 and 4, the servoactuator indicated generally by the numeral 12 has a generally circular housing 12a which defines a fluid pressure chamber 12b therein. Fluid pressure, preferably vacuum, is introduced into the chamber 12b through a vacuum port tube 12c extending through the wall of the housing 12a. The vacuum port to 12c has an orifice $12c_1$ of predetermined diameter provided in the end of the tube 12c which extends into the chamber 12b. An atmospheric vent port is provided by a second tube 12d which extends through the wall of the housing 12a and into the chamber 12b. The vent tube 12d also has an orifice $12d_1$ of predetermined size formed in the end thereof which extends into chamber 12b. In the presently preferred practice of the invention, the vent port $12d_1$ is aligned concentrically and spaced axially from the vacuum port orifice $12c_1$ by a predetermined distance. An alternating means in the preferred form of a valve flapper 12e has one end $12e_2$ thereof disposed between the vacuum and vent orifices $12c_1$ and $12d_1$, respectively. The alternating means in the form of valve flapper 12e is mounted to the housing 12a to pivot about fulcrum $12e_1$, intermediate the ends thereof, provided by bracket 12f secured to the housing 12a. The end $12e_2$ of flapper 12e disposed between the vacuum and vent orifice is preferably formed of a flexible band of metal extending in looped fashion from the member 12e. The end $12e_2$ of flapper disposed on the opposite side of fulcrum $12e_1$ has a bias means in the form of tension spring 12g attached thereto, with spring 12g having one end secured to an arm 12h pivotally mounted to the interior of the housing 12a. Spring 12g and pivoted arm 12h are disposed such that the tension spring 12g biases the flapper 12e to a position such that the flexible band 12e$_2$ rests against vacuum orifice 12c$_1$ and closes same.

Pivot arm 12h passes through pivotal attachment in the form of a bushing 12i attached to the interior of the housing 12a. The end of arm 12h opposite the tension spring 12g, as denoted in FIG. 3, has a roller bushing 12h$_1$ provided on the end thereof for contacting the throttle actuator as will be hereinafter described. A second bias means 12j in the form of a compression spring is disposed so as to aid tension spring 12g and spring 12j has one end attached to the end 12e$_3$ of the flapper. The opposite end of the compression spring 12j registers against an adjustment screw 12k extending through the wall of the housing 12a. Adjustment screw 12k provides a means of adjusting the initial bias of the flapper 12e in the vacuum orifice closing position.

The bias force acting upon the flapper 12e is thus a combination of the spring forces of tension spring 12g and compression spring 12j. However, the spring constant of tension spring 12g is preferably substantially greater than the spring constant of the compression spring 12j, such that the compression spring 12j provides only a static preload for initial bias adjustment of the flapper position. Movement of the flapper during alternation or the change in the position of the feedback arm 12h does not cause any appreciable change in the force applied to the flapper 12e by the compression spring 12j.

Means are provided for alternating the flapper 12e from an initial position closing vacuum orifice 12c$_1$ to pivot about fulcrum 12e$_1$ to a position where the end 12e$_2$ of the flapper is spaced from, and opens, vacuum orifice 12c$_1$ with the end 12e$_2$ contacting and closing vent orifice 12d$_1$. The means for alternating the flapper 12e preferably comprises a coil 12x secured to the housing within chamber 12b and having preferably an iron core 12y with electrical leads 12x$_1$ and 12x$_2$ provided and which pass through the wall of the vacuum chamber in any convenient manner so as to prevent passage of fluid pressure therethrough.

The coil 12x receives a series of width modulated electrical pulses from the control circuitry located in the housing 14, see FIG. 1, which energize the coil for a period of time equal to the width of the pulse. When current flows through coil 12x, a magnetic field is induced in iron core 12y which attracts flapper 12e as an armature, causing flapper 12e to overcome the bias of spring 12g, 12j and pivot about fulcrum 12e$_1$. As the flapper 12e is attracted to core 12y, the loop-band end 12e$_2$ opens vacuum vent orifice 12c$_1$, and moves to a position closing vent orifice 12d$_1$, as flapper 12e comes to rest against the end of core 12y. When current from the electrical pulse control signal ceases to flow in the coil, flapper 12e returns to its initial position with loop-band end 12e$_2$, reclosing the vacuum orifice 12c$_1$, and reopening vent orifice 12d$_1$. The flapper thus alternates, or oscillates at a substantially uniform frequency and fixed excursion; however, the dwell period during which the vacuum orifice is closed is varied during each cycle of alternation, or oscillation. The movement of the flapper 12e alternately the fixed distance betwen the vacuum and vent orifices provides for alternate drawing of and venting of vacuum in the chamber 12b. Thus, by controlling the length of time during each excursion of the flapper end 12e$_2$ in which the vacuum port is open, a desired vacuum may be produced in the chamber 12b.

Referring to FIG. 4, the housing 12a has disposed therein the preferred actuator means in the form of a flexible fluid impervious diaphragm 12m having the periphery thereof attached in a sealing manner to the inner periphery of the cylindrical housing 12a as, for example, by a compression seal between sections of the housing. The diaphragm 12m thus is disposed so as to form, in cooperation with the interior of the housing 12a a portion of the wall of vacuum chamber 12b. Bias means in the form of a compression spring 12n is provided to urge the flexible diaphragm against the inner surface of the housing in such a manner as to maximize the volume of the chamber 12b. Diaphragm 12m has a rigid backing plate 12$_z$ secured thereto for movement with portions of the diaphragm and for receiving one end of the compression spring 12n. Pivot arm 12h has the roller 12h$_1$ thereof registering against the underside of backing plate 12z such that motion of the diaphragm and backing plate within the housing causes movement of pivot arm 12h which, in turn, alters the bias of spring 12g on the flapper 12e. The diaphragm 12m and backing plate 12$_z$ have attached centrally thereto a connecting rod 12p which extends through an aperture 12a$_1$ in the housing with means provided thereon for connection to the throttle control rod 13.

In operation, as the flapper valve 12e alternates to create a vacuum in chamber, the vacuum causes diaphragm 12m to move to the left in FIG. 4, in a direction compressing bias spring 12n, for exerting a tension force on throttle control rod 13 for increasing the engine speed. As the vacuum in chamber 12b increases, the diaphragm 12m continues to move to the left in FIG. 4 to some new position as shown in dashed line in FIG. 4 causing the roller end 12h$_1$ of arm 12h to also move to the left in FIG. 4. Motion of the roller end 12h$_1$ of arm 12h to the left in FIG. 4 causes pivoting of the arm 12h in bushing 12i in such a manner that the tension in spring 12g is increased. Thus, as the vehicle throttle is opened a greater amount, the force biasing the flapper 12e to a position closing vacuum orifice 12c$_1$ is increased. This increased bias Fs provides a positive attenuating effect on the throttle actuator since, with greater bias force Fs acting upon it, the flapper 12e will be less responsive to the magnetic force from coil 12x tending to move the flapper to the position opening vacuum orifice 12c. Thus, the servoactuator 12 of the present invention incorporates a novel means of providing attenuation of the throttle actuator when the throttle is already in a substantially opened position, despite any electrical pulse control signals calling for increased throttle opening. Attenuation of the actuator by throttle position feedback to attenuate the vacuum valve thus provides a novel and unique means of preventing "hunting" or oscillation of the vehicle about the desired SET speed.

The unique servoactuator of the present invention enables the present speed control system to utilize electrical control signal circuitry, having a very high degree of sensitivity to changes in vehicle speed, for providing an electrical control signal accordingly. The increased sensitivity is prevented from causing erratic operation and over control of the throttle actuator by the attenuation and dampening of the actuator vacuum valve 12c.

Figure 5:
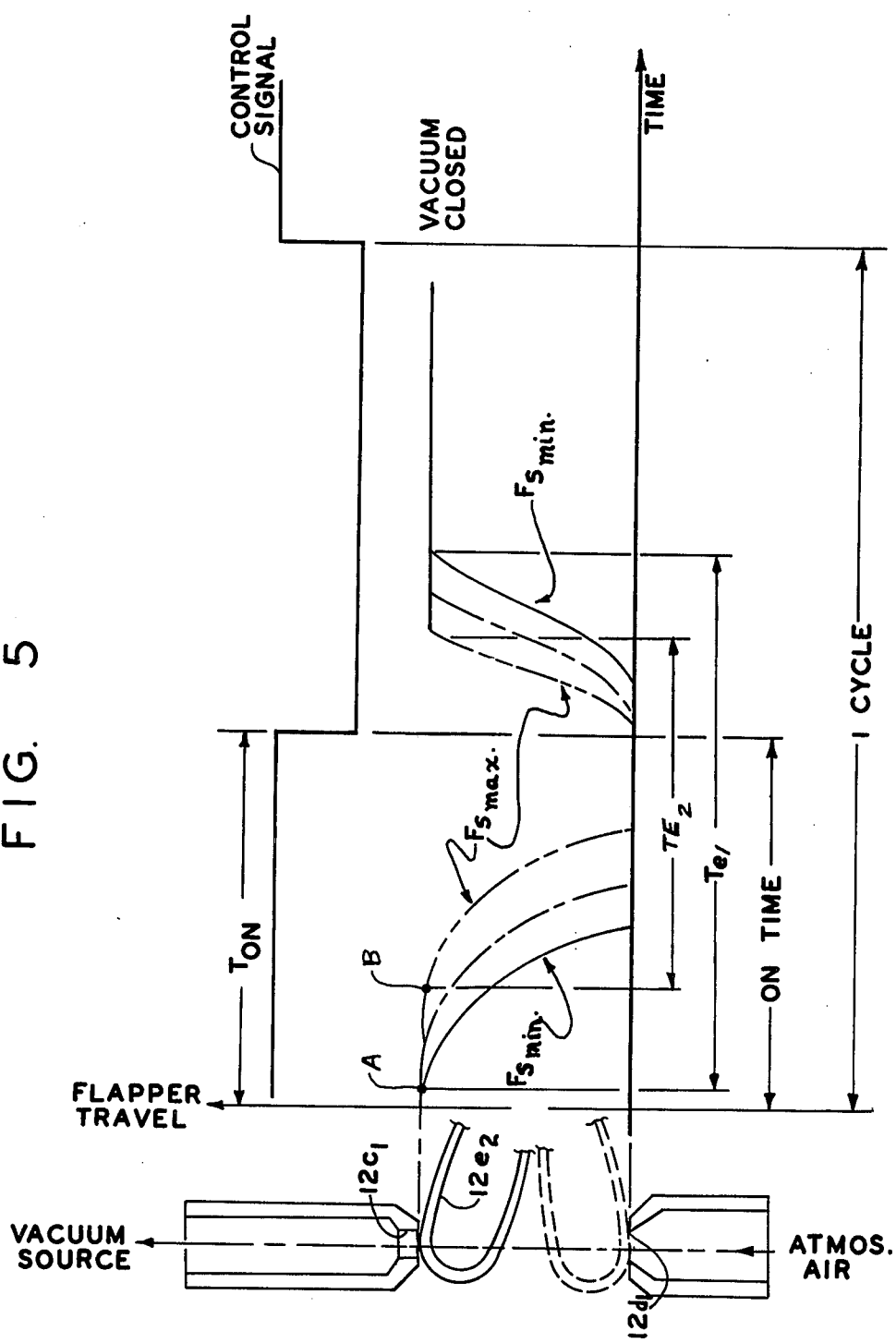
FIG. 5 is a graph which illustrates the effect on the vacuum flapper valve open time of changes in the flapper biasing force.
Figure 6:
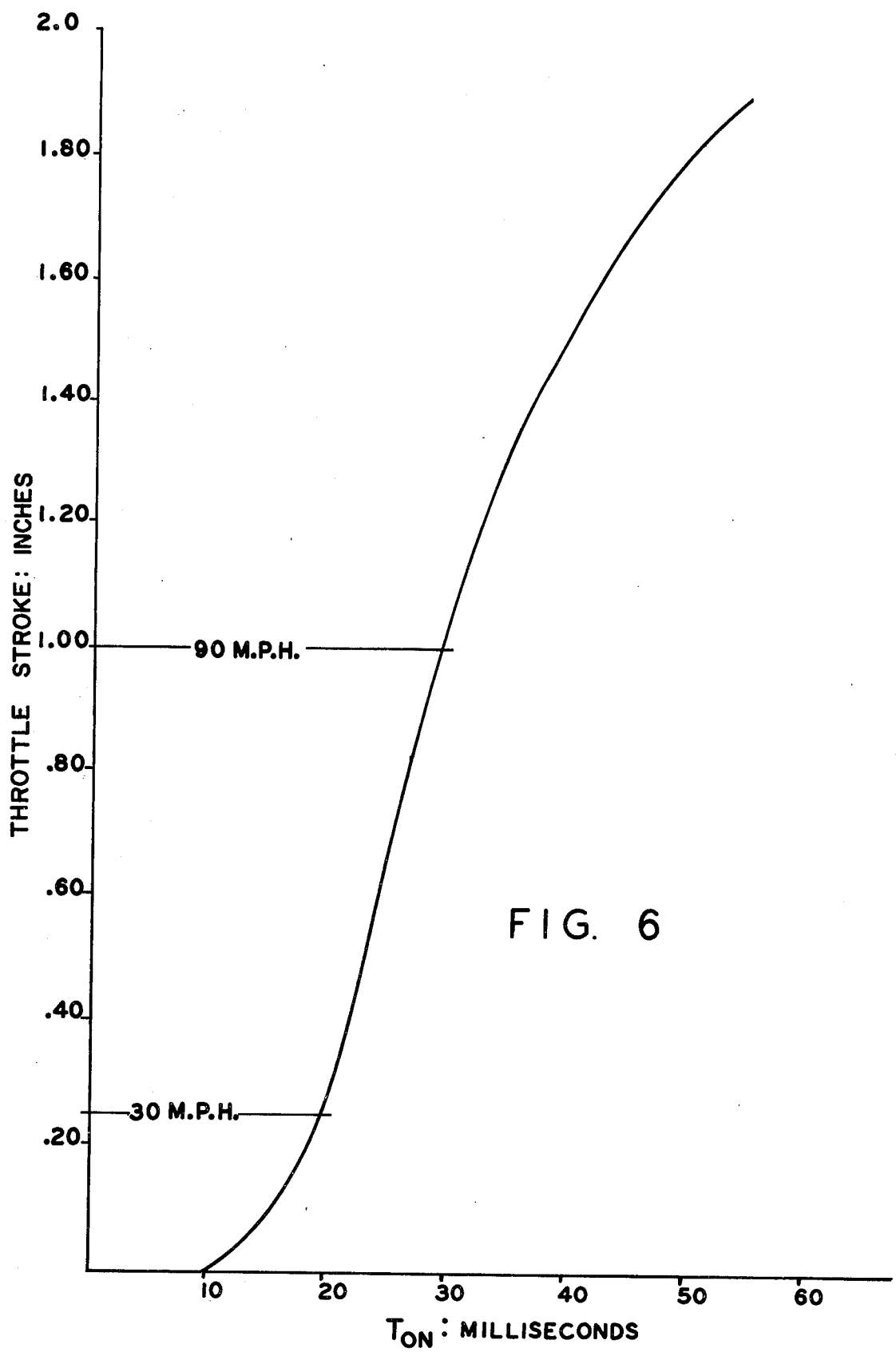
FIG. 6 is a graph of the throttle actuator movement plotted for valves of corresponding "on" time of the electrical pulse control signals.

Referring now to FIG. 5, the effect of increasing the spring bias force Fs on the flapper 12e is shown as it affects the effective vacuum open time $T_E$ of orifice 12c$_1$. The flapper bias force Fs includes the tension force applied by spring 12g and compression spring $12j_1$; however, as mentioned hereinabove, the force due to the compression spring is substantially constant and much less than the force of the tension spring, and will be ignored in describing the servoactuator responsiveness. With reference to FIG. 5, it is noted that, at the minimum spring bias force condition $Fs_{min}$, as shown by the solid curve in FIG. 5, for any given width of control signal indicated by $T_{ON}$, the flapper 12e begins to move away from the vacuum orifice $12c_1$ at point "A". For the case of closed throttle, or minimum bias force $Fs_{min}$, the flapper 12e has an average dwell time $Te_1$ which is greater than the average dwell time $Te_2$ for the case of maximum spring bias force $Fs_{max}$ which occurs at wide-open throttle and shown in dashed outline in FIG. 5 where flapper motion begins at point "B". Furthermore it will be noted that increasing the spring bias force $Fs$ delays the point in time at which the flapper begins to move away from orifice $12c_1$ as denoted by the distance between points "A" and "B" in FIG. 5. Thus the net effect of increasing the spring bias force $Fs$ is to delay the opening of the vacuum port $12c_1$ and to decrease the average time in which the vacuum port $12c_1$ is open during each cycle of flapper alternation. The servoactuator 12 thus permits the control response circuitry to be very sensitive to small changes in vehicle speed and to provide corresponding changes in the control signal. This permits the effective width of the electrical pulse or ON-time $T_{ON}$ in FIG. 5, to be varied substantially for small changes in vehicle speed. Referring now to FIG. 6, the response for a typical speed regulator 10 made in accordance with the present invention is illustrated where the system is used on a vehicle having throttle return spring force ranging from 2.5 to 4.5 pounds for full stroke of the throttle. For such a throttle it has been found satisfactory to have a spring rate for tension springs 12g of 0.833 pounds per inch and a diameter for vacuum orifice $12c_1$ of 0.041 inches and a diameter for vent orifice $12d_1$ of 0.059 inches.

In order that the servoactuator be sufficiently responsive to the electrical control pulses applied to coil 12, the vacuum orifice $12c_1$ and vent orifice $12d_1$ should preferably have a diameter less than seven one-hundredths of an inch (0.070) but greater than three one-hundredths of an inch (0.030).

The electrical control signal has a preferred pulse voltage of 12.5 volts and a preferred pulse frequency of 16 hertz. With reference to FIG. 6, it will be seen for the system described above, that a relatively small change in the width of the electrical control pulse $T_{ON}$ produces a very large change in the stroke of the diaphragm 12m. The preferred control signal sensitivity of 8 milliseconds change in $T_{ON}$ per mile per hour change in vehicle speed was used.

In the preferred practice of the invention, the system 10 having a control circuit sensitivity of 8 milliseconds in control pulse width for each mile per hour vehicle speed variation about the set speed and with the above-described servoactuator 12, will provide an overall capability to control the vehicle within plus or minus one-half mile per hour within the operating range of the system.

From FIG. 6 it is apparent that a one mile per hour change in vehicle speed about a given "SET" speed would produce a corresponding movement of approximately one-tenth of an inch of the diaphragm and control rod 13. In the presently preferred practice of the invention, the system having the characteristics described above is operated with an actuator stroke ranging from 0.25 to 1 inches movement of the diaphragm. This corresponds to vehicle speeds in the range of from 30 to 90 miles per hour for a vehicle having the throttle characteristics above and a weight in the range of 4000 – 5000 lbs.

It will be apparent that the frequency of alteration of the flapper 12e must be properly chosen, such that the pressure in chamber 12b will be satisfactorily responsive to the changes in pulse width of the control signal to coil 12L. If the flapper alternates too slowly, the pressure in chamber 12b will pulsate, causing corresponding pulsations in the diaphragm and jerking on the vehicle throttle. If, however, the frequency of alteration of flapper 12e is too high, the pressure in chamber 12b will be unable to follow the control signal and the response of the servactuator will be sluggish.

The flapper 12e may have a frequency of alternation other than the 16 hertz value described above with respect to the preferred form of the servoactuator; however, it has been found practical to limit the frequency of alternation of the flapper 12b within the range of 10 to 25 hertz.

Referring to FIGS. 1, 3 and 4, the servoactuator 12 is typically installed in the system 10 with the housing 12a mounted on a support bracket 17 rigidly attached to the vehicle engine. The vacuum port tube 12c has vacuum hose 15 from the intake manifold connected thereto for applying engine manifold vacuum to the orifice $12c_1$. Power leads $12x_1$ and $12x_2$ from the flapper alternating coil 12x are contained in lead cable L2 of FIG. 1. A rod 12p attached to the actuator diaphragm is connected to the vehicle throttle T by throttle control rod 13. A slotted linkage or other expedient for lost-motion return is typically employed; as is well known in the art and, the details of such a linkage have been omitted from the drawings for simplicity. Thus, in the preferred arrangement, the diaphragm exerts a force on the throttle T only when the diaphragm moves in a direction to the left in FIG. 4. As will be readily understood by ordinary artisans, with such a typical lost-motion throttle hookup, opening of the throttle by the accelerator can not exert any force which would tend to move the diaphragm.

Although the servoactuator 12 of the present invention has been described above in its preferred form, variations in the settings of the components thereof may be made within the purview of the invention. For example, the vacuum orifice and the vent orifices may be varied such that the diameter of either does not exceed 0.070 inches and the ratio of the areas of the vent orifice $12d_1$ to the diameter of the vacuum orifice $12c_1$ is maintained in the range of 1.5 to 1 through 2.5 to 1. The preferred spacing between the flapper end $12e_2$ and the vent orifice $12d_1$ is 0.025 inches with flapper end $12e_2$ against the vacuum orifice $12c_1$. However, the clearance between the flapper end $12e_2$ and vent orifice $12d_1$ may be varied within the range 0.020 – 0.050 inches.

Referring now to FIG. 4, means are provided for releasing the vacuum in the chamber 12b rapidly upon actuation of the vehicle brake pedal by the operator. A spring loaded valve assembly 12r is provided in which a stationary coil 12s attracts a movable core 12t such that, upon energization of the solenoid 12s, the core 12t moves toward a vent orifice 12v to close same. The core 12t is biased by a spring 12u so that, in the normal or unactuated state, the end of core 12t is spaced from the vent orifice 12v. Upon energization of the solenoid the core 12*t* moves to a position closing orifice 12*v* thereby permitting vacuum to be maintained in chamber 12*b*. The solenoid 12*s* is electrically energized by electrical brake disable switching means provided in the circuitry within housing 14 upon activation of SET or RESUME switches 16*a*, 16*b*. Upon application of the brake pedal by the vehicle operator, the current to the solenoid is discontinued and the spring moves the armature to a position opening the vent so as to cause immediate loss of vacuum in the chamber 12*v*. This arrangement of the quick release dump valve provides a fail safe feature in the event of malfunction of the control circuitry or loss of system electrical power or shorting of the solenoid. The atmospheric vent orifices 12*d*₁ and 12*v* for the brake release valve assembly are both provided with filters 12*q* and 12*x*, respectively, so as to prevent entrance of foreign particles into the vacuum chamber 12*b* upon venting.

ELECTRICAL CONTROL SIGNAL GENERATION

Figure 2:
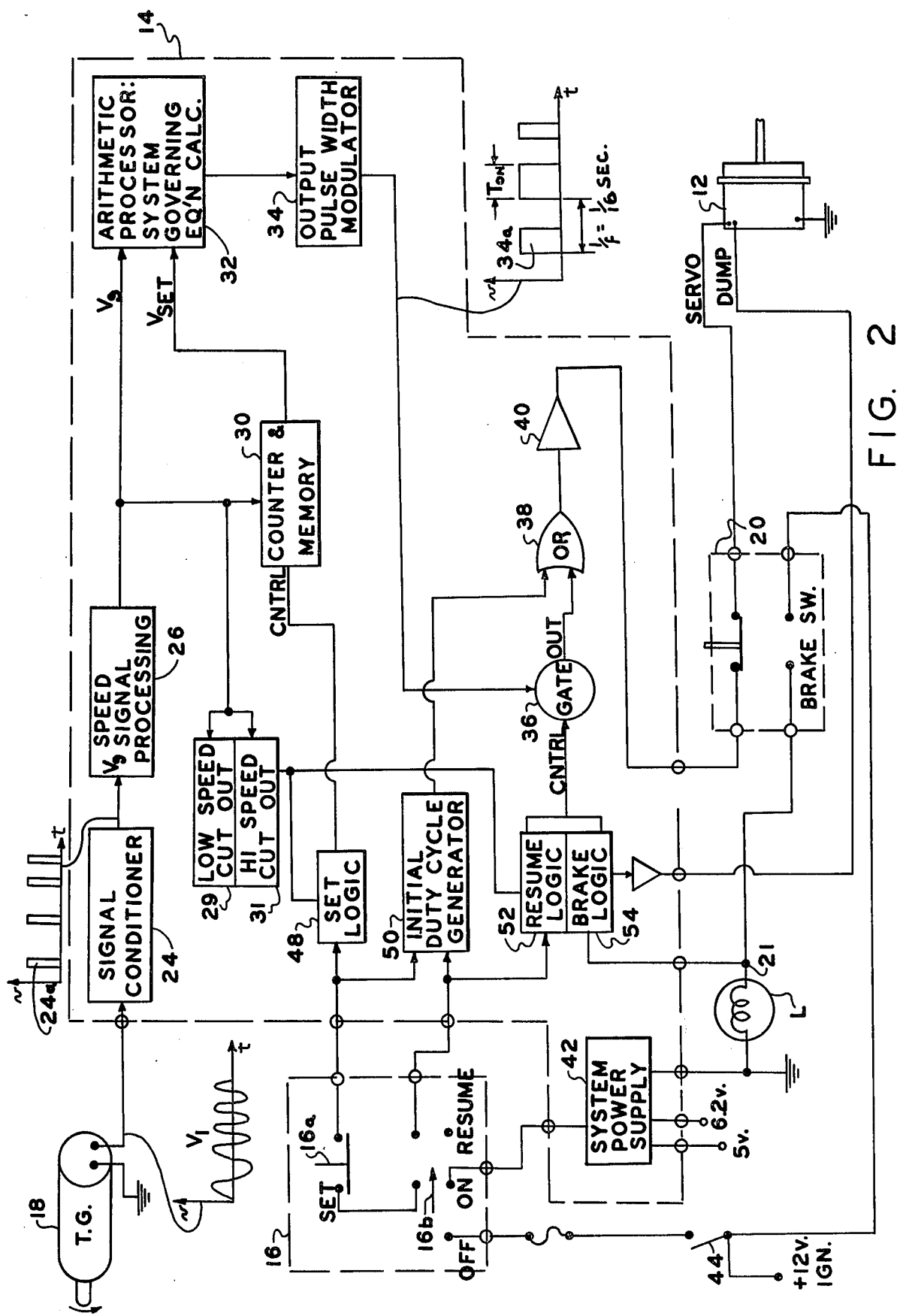
FIG. 2 is a functional block diagram of the system of FIG. 1.

Referring now to FIG. 2, a logic diagram of the circuitry for the system 10 of FIG. 1 is illustrated with the components disposed within the housing 14, indicated by a dashed line in FIG. 2. The alternating signal $V_1$ from the tachometer generator 18 is conditioned, filtered and converted by the signal conditioner 24 to a series of constant amplitude DC pulses 24*a* having a frequency proportional to the vehicle speed. The signal from the conditioner 24 is further processed by speed signal processing unit 26 to a form suitable for the counter and memory indicated generally at 30 and the arithmetic processor unit indicated generally at 32. The counter and memory unit 30, upon command by the SET logic 48, which receives an input signal from set switch 16*a*, provides a signal to the arithmetic processor representative of the value of the vehicle speed at the instant the set switch 16 is released. The arithmetic processor 32 performs a calculation in accordance with a system governing equation to produce an output signal for driving the pulse width modulator 34. The pulse width modulator 34 provides a series of electrical pulses of constant amplitude and fixed frequency having the width of each pulse varied in accordance with an instantaneous value of the system-governing equation, as computed by the arithmetic processor. The pulses from the modulator 34 are then applied through a series of gates 36 and 38, amplifier 40 and through brake switch 20 to the solenoid coil 12*x* of servoamplifier 12.

The speed signal from the signal processing unit 26 is also applied to the inputs of respectively a low-speed cutout 29 and a high speed cutout 31. The output of the high and low speed cutouts 29 and 31 is applied to an input of SET logic 48 and RESUME logic 52, the output of which is applied to the control input of gate 36. As long as a signal is received from both the high and low speed cutout logic and from the RESUME logic 52 or SET logic 48, gate 36 is operative to conduct the width modulated pulses to the servoamplifier 40. If either the high or low speed cutout 29 or 31, respectively, senses a prohibitive speed condition, the signal therefrom ceases, and the SET or RESUME logic ceases to conduct and disables gate 36 to prevent further control pulses from being applied to the servoactuator 12. Similarly, if no signal is present from the output of RESUME logic 52 or SET logic 48 gate 36 is also disabled.

Brake disable logic 54 receives an input signal from the vehicle brake switch 20 and is operative to provide a signal to gate 36 and also to vacuum dump valve 12*r* of the servoactuator 12. Thus, upon activation of the vehicle brake switch 20, brake disable logic 54 renders gate 36 nonconductive and simultaneously opens the vacuum vent valve 12*r*.

An Initial Duty Cycle Generator, indicated generally at 50, is provided and receives an activating signal from SET switch 16*a* or RESUME switch 16*b*. Initial duty cycle generator 50 is operative, upon each actuation of the SET or RESUME switch, to provide a one-shot output pulse signal of predetermined duration such that the alternating flapper valve will be held in the vacuum open position, for a length of time sufficient to initially evacuate the vacuum chamber 12*b*. The output of initial duty cycle generator 50 is applied to a separate input of OR gate 36.

ANALOG-DIGITAL EMBODIMENT

Figure 7:
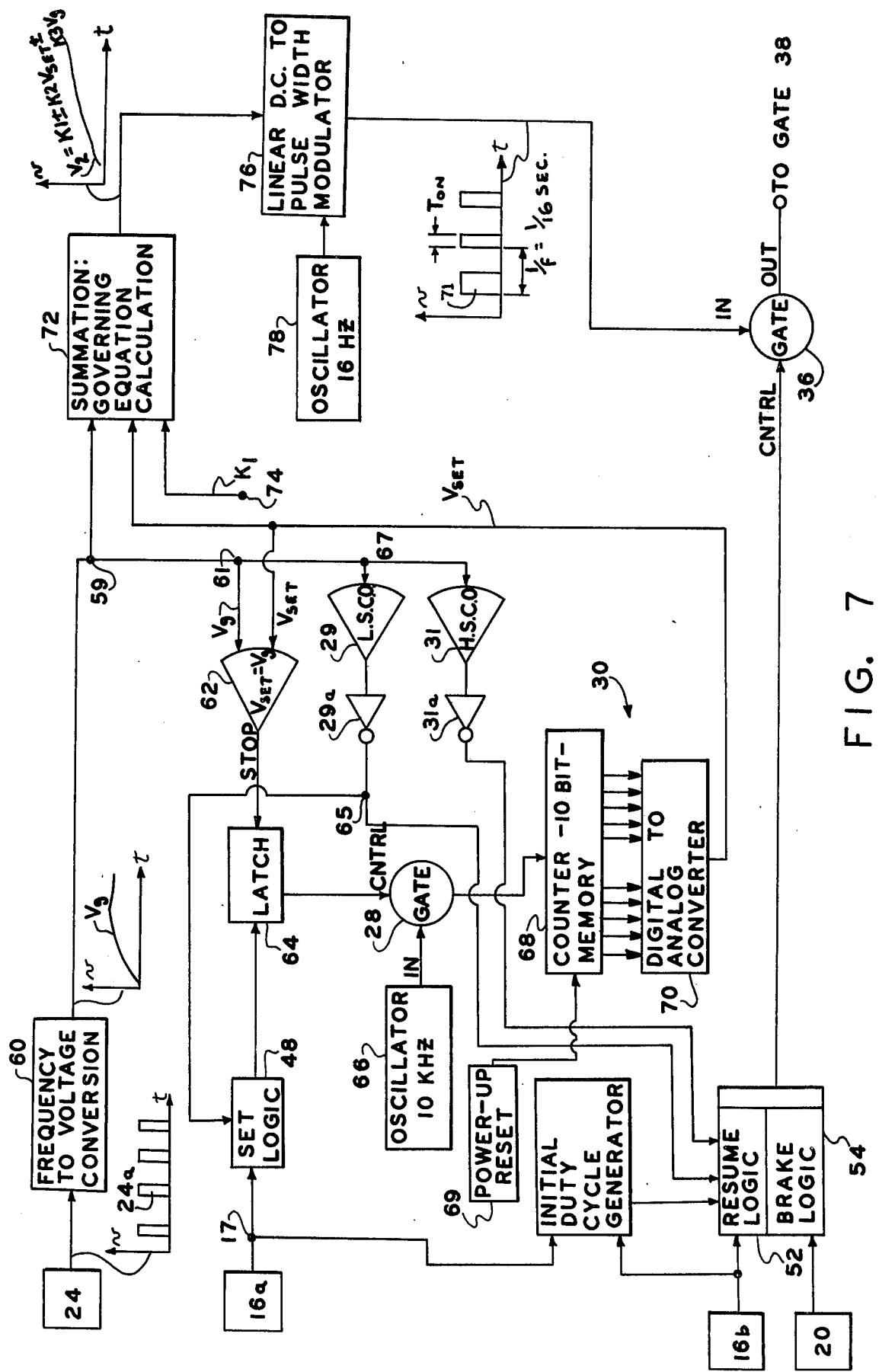
FIG. 7 is a functional and logic block diagram of the system of FIG. 2 employing analog-to-digital techniques.

Referring now to FIG. 7, the circuit logic is illustrated for one embodiment of the invention utilizing analog-digital circuitry. With reference to FIG. 7, similar numerals will be used to refer to similar components of the system shown in FIG. 2. Pulses 24*a* from the output of signal conditioner 24, having a frequency proportional vehicle speed, are applied to the input of frequency-to-voltage converter 60, the output of which produces a continuously varying DC voltage indicated as $V_g$ in FIG. 7, having amplitude proportional to the instantaneous vehicle speed. The voltage $V_g$ is applied through junctions 59, 61 and 67 respectively to the inputs of the arithmetic processor 32, to the input of a counter-stop comparator 62, to the input of a low speed cut-off comparator 29, and to the input of high speed cut-off comparator 31. Counter stop comparator 62 has the output thereof applied to the RESET input of latch 64, and is operative to conduct thereto when a reference signal, applied to a separate input thereof, exceeds in value the amplitude of the speed voltage $V_g$. When the SET speed voltage $V_{set}$ exceeds the vehicle speed $V_g$, latch 64 is operative to conduct $V_{set}$ to the Control input of a gate 28. Gate 28 receives at its input a signal from an oscillator 66, preferably having an output signal frequency of ten kilohertz, and gate 28 is operative to apply the alternating voltage from oscillator 66 to the input of the counter and memory 30. In the embodiment, shown in FIG. 7, the counter and memory 30 comprise a ten-bit counter and memory 68 having the output registers thereof applied respectively to the inputs of an ten-register digital-to-analog converter 70. Upon pushing and release of the SET button 16*a* by the vehicle operator, the SET logic 48 causes gate 28 to apply the oscillator output to the counter and memory 68. Upon release of the SET button 16*a*, the SET logic 48 stops latch 64 from conducting and, in turn, removes the "ON" signal from the control input of gate 28, which stops application of the oscillator output to the counter 68, which in turn retains the count of the frequency of the signal $V_g$ from the frequency voltage conversion unit 60. The count of the vehicle speed voltage $V_g$ is then passed to the digital-to-analog converter 70 which converts the count to a DC voltage $V_{set}$ which is proportional to the speed at which SET button 16*a* was released. The voltage $V_g$ from the frequency to voltage converter 60 and voltage $V_{set}$ from digital-to-analog converter 70 are then applied to the arithmetic processor 72 which also receives an input from a reference voltage source 74.

The arithmetic processor 72 produces an output in the form of a signal having one characteristic thereof, such as a DC voltage $V_2$ proportional to the system governing equation:

$$V_2 = K_1 + K_2 V_{set} + K_3 V_g$$

The details of the operation of the arithmetic processor 72 and the system governing equation calculation and determination of the constants $K_1$, $K_2$ and $K_3$ will be set forth hereinafter in greater detail with reference to system calibration. The output of arithmetic processor 72 in the form of a voltage $V_2$ proportional to the system governing equation is then applied to the input of a linear DC voltage to pulse-width modulator 76, which receives timing pulses from an oscillator 78 having an output frequency of preferably 16 hertz. The pulse width modulator 76 produces at its output a series of DC square wave pulses 71 with each pulse having the width thereof proportional to a value of $V_2$ and with the frequency of the pulses as determined by the signal from the oscillator 78. The width modulated pulses 71 are then applied to the input of gate 36, see FIG. 2, for operating the flapper valve 12e of servoactuator 12. The method of the present invention thus includes sensing vehicle speed to selectively provide substantially instantaneous values of actual vehicle speed in registering one such value of sensed speed as the selected speed. A control signal is then generated having one characteristic thereof in accordance with the aforesaid governing equation and the control signal is utilized to operate a servoactuator for controlling the vehicle throttle.

The construction and operation of the various components of the system of FIG. 7 will now be described in greater detail with reference to FIGS. 8, 9, 10 and 11.

Figure 8:
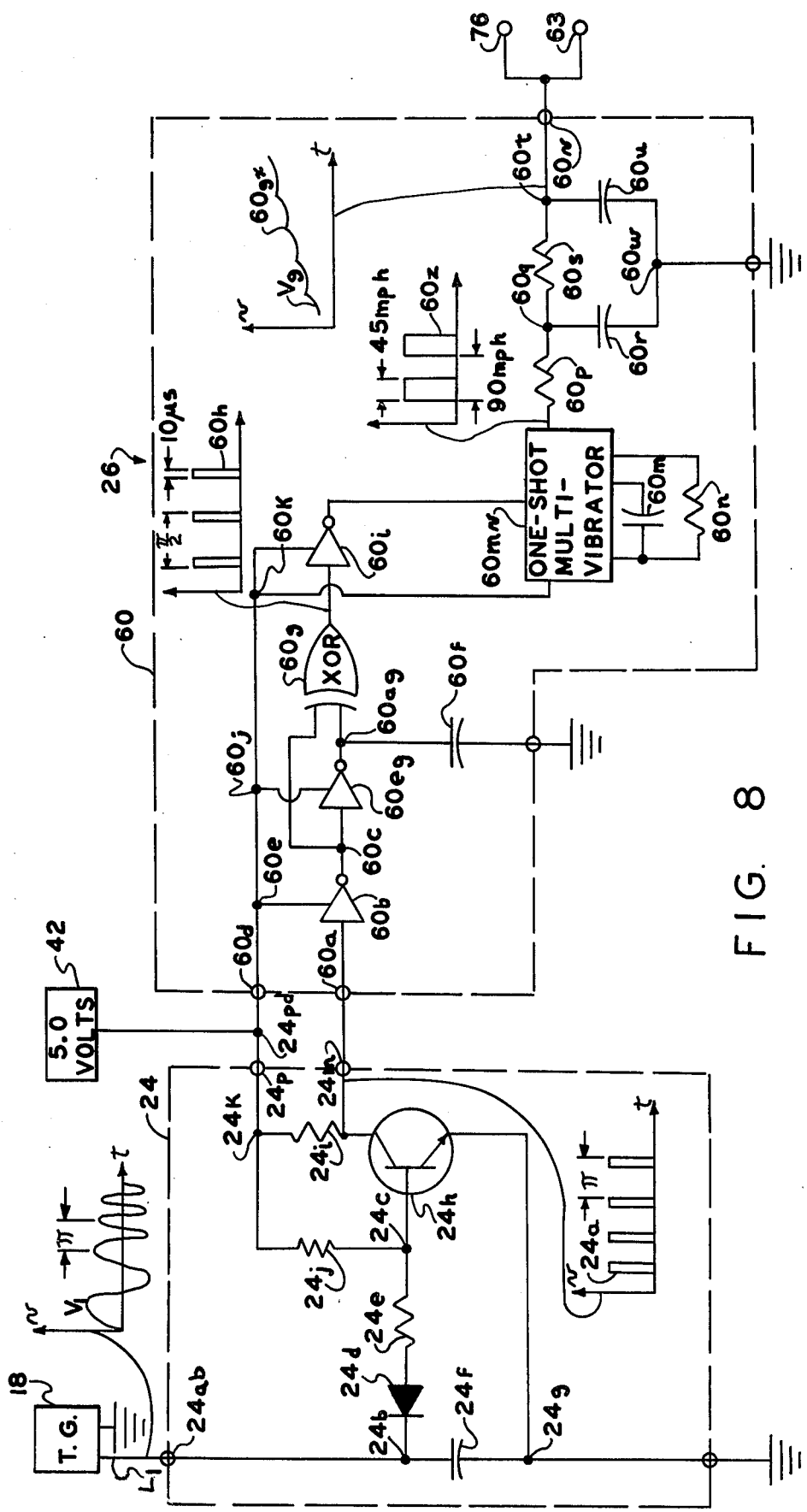
FIG. 8 is a detailed logic diagram of the signal conditioner and frequency-to-voltage width converter of the system of FIG. 7.

Referring to FIG. 8, the circuitry of the signal conditioner 24, for conditioning the tachometer generator output signal $V_1$, and the frequency-to-voltage converter 60 are illustrated wherein the input lead $L_1$ see FIG. 1, from the tachometer generator is applied through input terminal 24a to junction 24b which is also connected to one lead of a capacitor 24f with the other lead thereof connected to junction 24g, which is grounded. Diode 24d, poled as shown, has one lead thereof connected to junction 24b with the other lead connected, through resistor 24e, to junction 24c. Junction 24c has applied thereto a bias voltage from a source, preferably five volts, such as system power supply 42, see FIG. 1, through dropping resistor 24g. Junction 24c is also connected to the base of transistor switch 24h. The collector of transistor 24h is connected design dropping resistor 24i to junction 24k which is connected to a five-volt source as, for example, the system power supply 42. In operation, as the alternating voltage $V_1$ from the tachometer generator swings negative at junction 24b, the current flows through diode 24d and resistor 24j and 24k, thereby dropping the potential to the base of the transistor 24h causing the collector terminal to conduct. As the voltage $V_1$ at junction 24b goes positive, diode 24d is blocked and the potential at the base of transistor 24h is raised to the level of the five volts from the power supply and the transistor is turned off. When transistor 24h conducts during the positive going portion of the tachometer generator signal $V_1$, the resultant output is a series of DC pulses 24z applied to output terminal 24m of the signal conditioner 24, with the pulses 24z having a frequency pi ($\pi$) corresponding to the frequency of the signal voltage $V_1$ from the tachometer generator.

Referring again to FIG. 8, the frequency-to-voltage converter 60 has the pulses 24z from the output 24m of the signal conditioner applied to input 60a thereof and to an inverter amplifier 60b. A second input 60d receives power from a fivevolt supply as, for example, the power source 42, utilized for the signal conditioner 24, as does also inverter amplifier 60b through an intermediate junction 60e from the supply input 60d. The output of inverter 60b is connected to a junction 60c, which junction is connected to the input of a second inverter amplifier 60eg having the output thereof connected through an intermediate junction 60ag to one input of an Exclusive OR logic device 60g. The output of the first inverter 60b is taken also from junction 60c and applied to the second input of Exclusive OR 60g. The junction 60ag intermediate the second inverter 60eg and Exclusive OR 60g is connected to one lead of a capacitor 60f having the other lead grounded. In operation the effect of the cascaded inverters 60b and 60eg, with the bypass from junction 60c, connected to one input of Exclusive OR 60g, is to provide a frequency doubler for the pulses 24z coming from the signal conditioner. The signals received at the individual inputs of Exclusive OR 60g will be opposite in phase, and device 60g will conduct or go to a logic-one condition when the signal is received from either junction 60c or 60ag, and will provide output pulses 60h having a frequency of $\pi$/2 or one-half the frequency of the signal from the tachometer generator. The capacitor 60f is preferably chosen such that the pulses 60h will have a pulse width of approximately 10 microseconds. The pulses 60h from Exclusive OR 60g are applied to the input of an inverter amplifier 60i which receives five-volt power from a source such as system supply 42 through an intermediate junction 60k.

The output from inverter 60i is applied to the input of a one-shot multivibrator 60mv which is also powered by a five-volt supply such as 42, from junction 60k and is electrically in parallel with tuning resistor 60n and capacitor 60m. The details of the multivibrator construction are not considered a part of the invention and any currently available multivibrator may be used; however, an RCA No. CD4047 CMOS integrated circuit multivibrator has been found satisfactory. The capacitor 60m and the resistor 60n are chosen such that the multivibrator produces an output pulse width corresponding to the period of the pulse signal 60h from Exclusive OR 60g at 90 miles per hour vehicle speed. The multivibrator 60mv is retriggerable and is chosen to give a constant DC voltage output at speeds above 90 miles per hour. The DC pulse output of multivibrator 60mv is indicated in FIG. 8 by the numeral 60z and is illustrated for a pulse width corresponding to the speed of 45 1 miles per hour. The shape of the output signal 60z corresponding to a speed of 90 miles per hour is indicated by dashed line in connecting the pulses 60z.

The DC pulses 60z from multivibrator 60mv are then converted to a DC ripple wave form 60gx by a filter network comprising series resistor 60p connected to junction 60q. Parallel capacitor 60r is connected to junction 60q and to the grounded junction 60w with a second series capacitor resistor 60s connected to junction 60q and to a junction 60t. Junction 60t includes a second parallel capacitor 60u which is also connected to grounded junction 60w. Thus the capacitors 60r, 60u and resistors 60p and 60q form RC circuit time constants which, by appropriate choice thereof, the pulses 60z from the multivibrator 60mv are caused to have an exponentially increasing waveform during positive going portion of the pulse voltage and an exponentially decaying waveform during the negative going portion of the pulse as indicated by the waveform 60gx in the unit 60 of FIG. 8. The waveform 60gx corresponds to a DC voltage proportional to vehicle speed, as also designated $V_g$ in FIG. 8, for use in the system governing equation calculations as will be hereinafter explained. The waveform 60gx is thus supplied to the output terminals 60v of the frequency voltage converter 60.

Figure 9A:
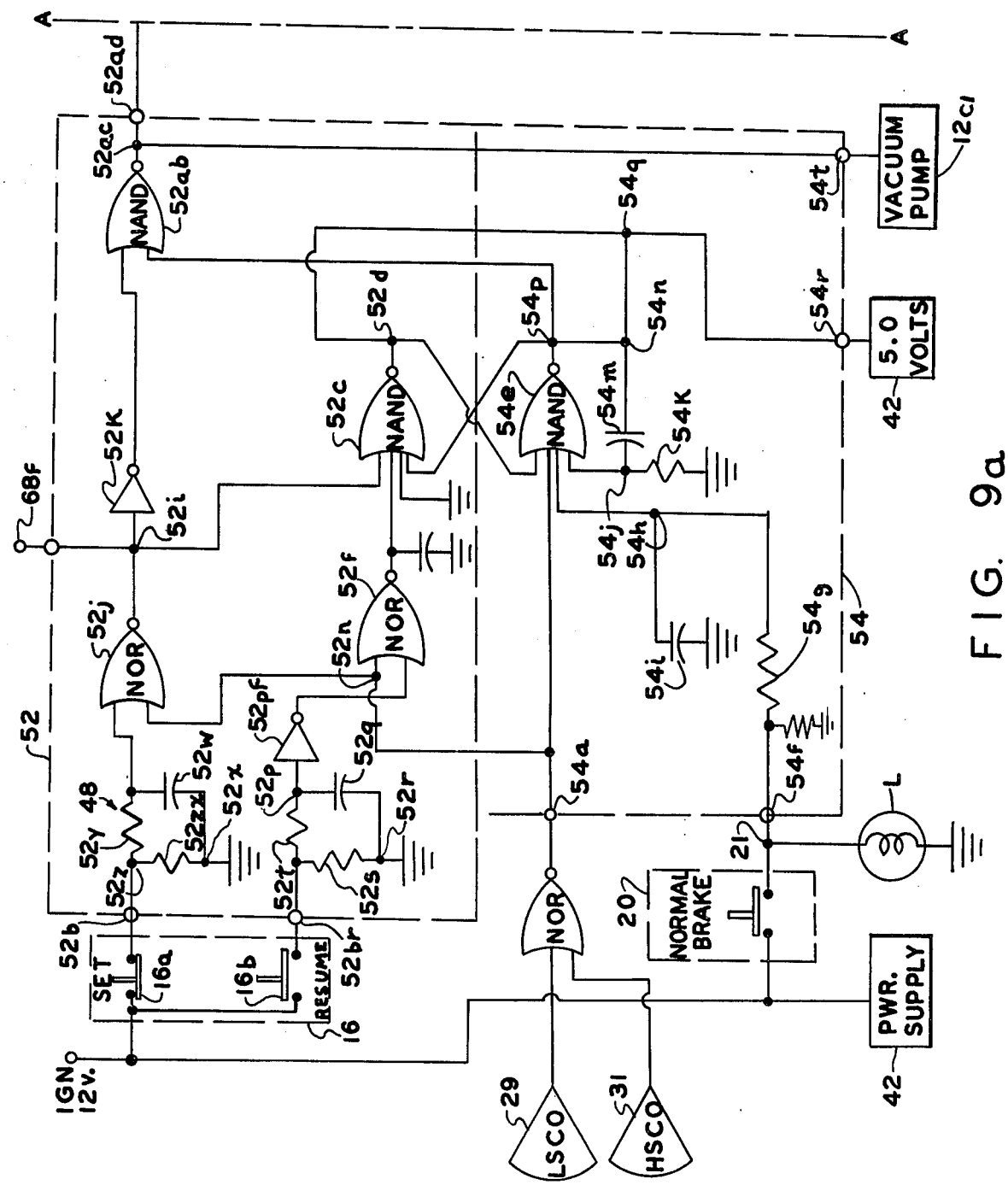
FIG. 9 is a logic diagram and schematic of the Set, Resume, Brake and Initial Duty Cycle components of the embodiment of FIG. 7 and, for convenience of illustration, has been divided along match lines A—A and A'—A' into two views labeled FIG. 9a and 9b where
FIG. 9b is a continuation of FIG. 9a, which views will hereinafter be referred to together as FIG. 9.
Figure 9B:
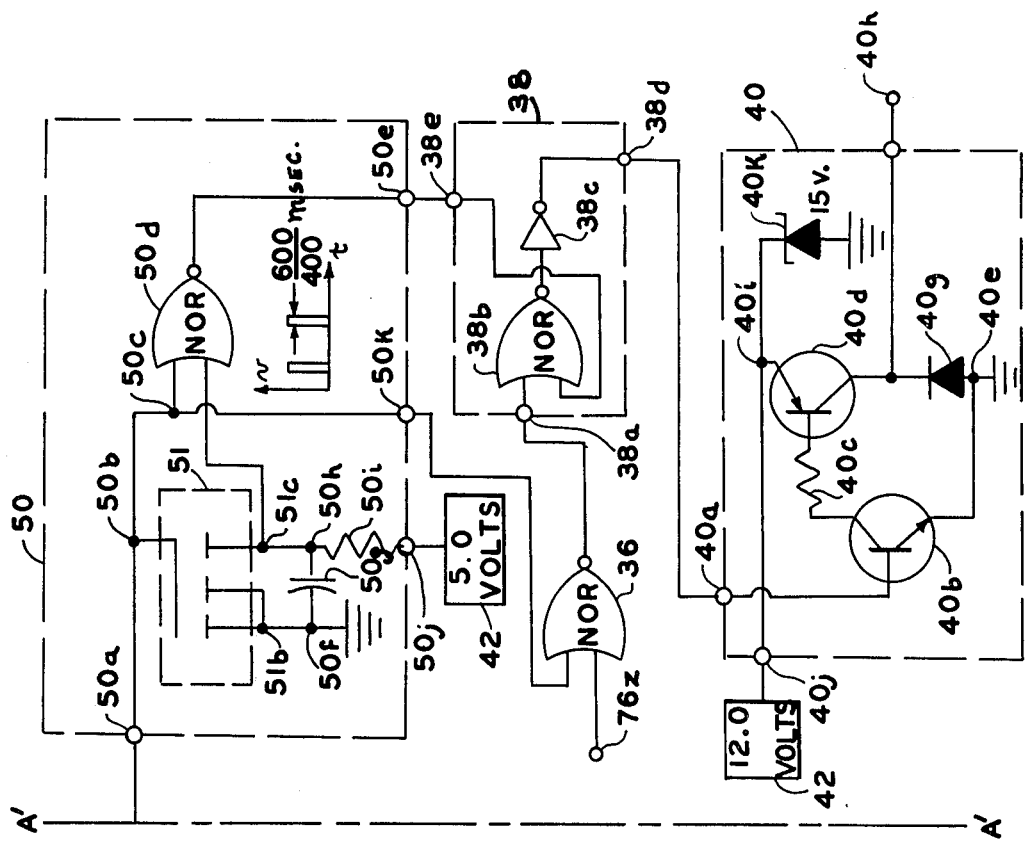
Figure 10:
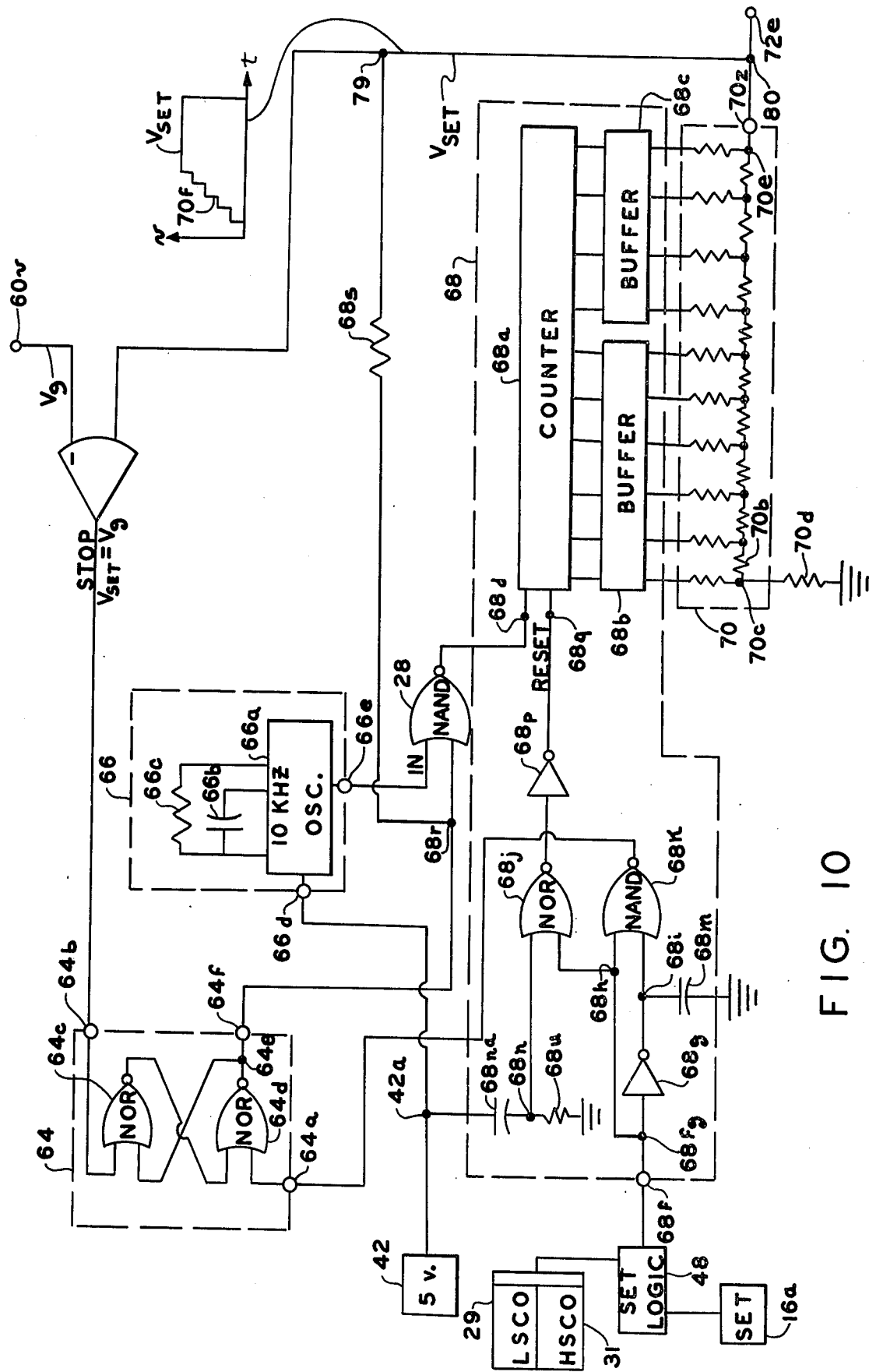
FIG. 10 is a logic block diagram and schematic of the counter and digital-to-analog converter of the system of FIG. 7.

Referring to FIG. 9, a combination logic diagram and schematic for the SET, RESUME, BRAKE and INITIAL-DUTY CYCLE portions of the circuitry are shown where the outputs of a Low Speed Cut-Off comparator 29 and High Speed Cut-Off comparator 31, ref. FIG. 7, are connected to inputs of a NOR device 33 to input terminal 54a of the BRAKE disable logic, which input is connected to junction 54b. Junction 54b is connected to one input of terminal of NAND logic device 54e. A second input 54f is connected from junction 21, ref. FIG. 2, to the vehicle brake pedal switch 20, and also through a series resistor 54g to junction 54h, which is connected to one lead of capacitor 54i which is grounded; and, junction 54h is also connected to a separate input of NAND 54e. A third input of NAND 54e is connected to junction 54j which is connected, through resistor 54k, to ground and which junction is also connected to one lead of capacitor 54m, which is connected to junction 54n. Junction 54n is connected to junction 54p which is connected to the output of NAND 54e. Junction 54p is also connected to one input of a second NAND 52c which has the output thereof connected to a junction 52d, which junction is connected back to a separate input of NAND 54e which, in combination with NAND 52c, forms a Set-Reset latch. A separate input of NAND 52c is connected to the output of a NOR 52f and a separate fourth input of NAND 52c is grounded. Junction 52d, at the output of NAND 52c, is connected to a junction 54q, which junction is connected to junction 54n and also to input terminal 54r connected to a five-volt source such as the vehicle power supply 42. NAND 52c has a fourth input thereof connected to junction 52i, which junction is connected to the output of a NOR 52j, the input of an inverter 52k, and also through an output terminal 52m to junction 68f, ref. FIG. 10, of the counter circuitry. NOR 52j has one input thereof connected to junction 52n, which junction is connected to a second input of NOR 52f and also to junction 54b which receives the input from the low speed cutout 63 through input terminal 54a. NOR 52f has a separate input thereof connected to the output of inverter 52pf, the input of which is connected to junction 52p. Junction 52p has capacitor 52q connected thereto, which capacitor is also connected to junction 52r, which is grounded. Junction 52p is also connected through series resistor 52t to junction 52u, which is connected through input terminal 52br to RESUME switch 16b and is also connected through resistor 52s to grounded junction 52r.

A second input of NOR 52j is connected to junction 52v which has capacitor 52w connected thereto, which capacitor is also connected to grounded junction 52x. Junction 52v is also connected through series resistor 52y to junction 52z, through input terminal 52b to SET switch 16a. Junction 52z also has resistor 52zx connected thereto which resistor is connected to the grounded junction 52x.

In operation, so long as no signal is produced by Low-Speed cutout 29 or High-Speed cutout 31 through NOR 33 at junctions 54b and 52n, NOR gates 52j, 52f and NAND gates 52c and 54e will be operative to conduct when signals are applied to the remaining inputs thereof. However, if either Low-Speed Cutoff 29 or High Speed cutoff 31 applies a signal through NOR 33 to junction 54b and junction 52n, then NOR gates 52j, 52f and NAND gates 52c and 52e are prevented from conducting. When no signal is received from Low Speed Cutoff 29m at junction 54b, and the vehicle operator pushes SET switch 16a, thereby opening the contacts of the switch, current is stopped from flowing to junction 52z and capacitor 52w is thus caused to discharge to ground, dropping the potential from junction 52v to zero which causes the input of NOR 52j to go to logic zero, permitting NOR 52j to conduct through inverter 52k to one input of NAND 52ab, which has the remaining input thereof connected to the output of NAND 54e through junction 52p. Inverter 52k thus causes the signal from NOR 52j to be a logic zero for application to the input of NAND 52ab. If no signal is received from the output of NAND 54e, NAND 52ab thus provides an output signal to junction 52ac, which junction is connected through output terminal 52ad to initial duty cycle generator 50 and also through output terminal 52ac to gate 36, ref. FIG. 2. Upon release of the set switch 16a by the operator, the circuit is completed and a potential is applied through junction 52v to the input of NOR 52j causing the same to be rendered nonconductive, and thus inverter 52k renders a signal to the input of NAND 52ab causing same to cut off the output to initial duty cycle generator 50 and gate 36.

If the Brake switch 20 should be actuated by the vehicle operator upon closing of the contacts thereof, a potential is applied through terminal 54f and junction 54h to one input of NAND 54e, and NAND 54e is driven to a logic zero, which causes NAND 52ab to cut off the signal to the control gate 36. Upon release of the Brake switch, NAND 54e is caused to conduct, thereby rendering NAND 52ab conductive for providing a signal to control gate 36.

When the set switch 16a is pushed to open the contacts, the output signal from NOR 52j is applied through junction 52i to an input of NAND 52c to thus Set the latch, comprising NAND's 52c and 54e, for retaining the SET signal. Upon subsequent closing the contacts of RESUME switch 16b, a potential is created at junction 52p and through inverter 50pf applied as a logic zero to one input of NOR 52f. If no Low-Speed or High Speed Cut-Off signal is received through NOR 33 by NOR 52f from junction 52n. NOR 52f goes to logic zero at the output and through junction 52e causes NAND 52c to go to logic one and provide, in combination with NAND 54e as a latch, an output signal to junction 54p which causes NAND 52ab to produce an output signal to control gate 36 and initial duty cycle generator 50. The output of NAND 52ab through junction 52ac is also applied through output terminal 54t to vacuum dump valve 12r in servoactuator 12, ref. FIGS. 3 and 4.

The above-described logic devices may be made from any commercially available integrated circuit components; however, RCA (Radio Corp. of America, Solid State Div., Somerville, New Jersey 08876) type CD4001 CMOS quad two input NOR gates have been found satisfactory for NOR devices 52j and 52f, RCA CMOS type CD4012 dual four input NAND gates have been found satisfactory for NAND logic latch devices 52c, and 54e, and an RCA CMOS type CD 4011 quad two input NAND gate has been found particularly suitable for NAND device 52ab.

Figure 12:
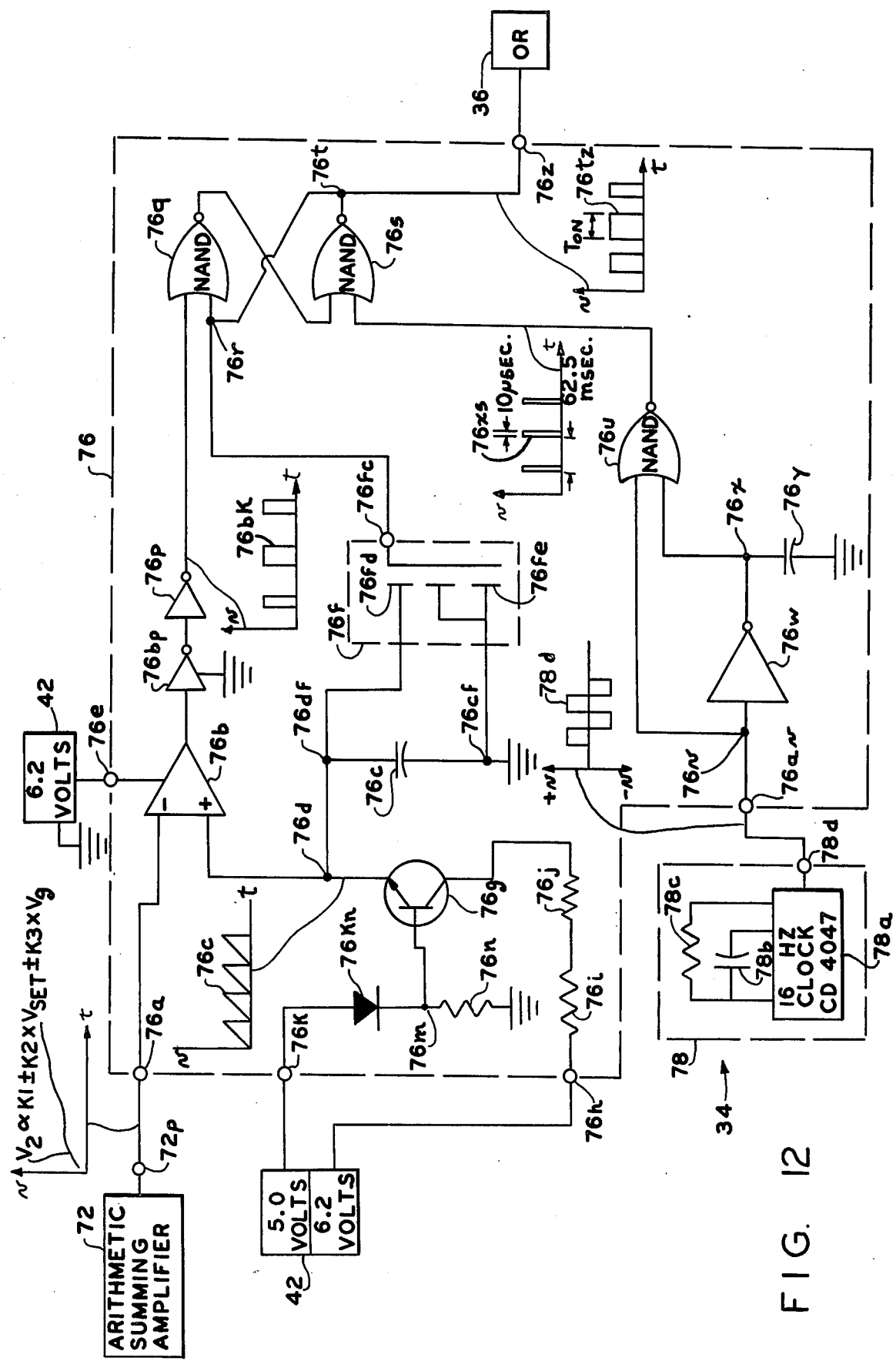
FIG. 12 is a functional and block diagram of the DC voltage-to-pulse width converter of the embodiment of FIG. 7.

Referring again to FIG. 9, Initial Duty Cycle Generator 50 has an input terminal 50a thereof connected to the output 52ad of Brake, Set and Resume logic 48, 52, 54, and junction 50a is also connected through junction 50b and through junction 50c to one input of NOR 50d, the output of which is connected through output terminal 50e to gate 38, ref. FIG. 2. Junction 50c is also connected through output terminal 50k to a separate input of NOR gate 36, which may be any commercially available NOR logic device; however, an RCA type CD4001 CMOS quad two input positive logic NOR gate has been found particularly suitable. NOR gate 36 has the remaining input thereof connected to output 76z of pulse width converter 76, ref. FIGS. 12 and 7. Junction 50b is also connected to common terminal 51a of solid state switching device 51 which may be of any suitable type known; however, an RCA type CD4007 CMOS device has been found particularly suitable. One normally open terminal 51c of switch 51 is connected to the remaining input of NOR 50d and also to junction 50h which is connected through resister 50i and input terminal 50j to a five-volt source of power from system power supply 42 (ref. FIG. 2). Junction 50h is also connected to capacitor 50g which is connected to grounded junction 50f, which junction is also connected to a second normally open terminal 51b of switch 51. Capacitor 50g is electrically in parallel with switch terminals 51b and 51c and in series with capacitor 50i such that, upon discharge of capacitor 50g, the potential at junctions 50h and 51c is lowered to zero. The time required for discharge is controlled by the choice of capacitor 50g and resistor 50i, which choice determines the RC time constant of the network. Upon receipt of a signal from the Brake, Set or Resume logic at terminal 50a, switch 51 closes, discharging the capacitor 50g, while the signal from junction 50b is simultaneously applied to NOR 50d and through output terminal 50k to NOR gate 36. When the signal from junction 50c is applied to one input of NOR 50d with the potential from power supply 42 through input 50j applied to the remaining input terminal, NOR 50d is operative to conduct a signal through output terminal 50e to gate 38. The capacitor 50g and resistor 50i are chosen so as to prevent capacitor 50g from discharging completely for a desired delay period before the zero potential at junction 51c causes NOR 50d to be rendered nonconductive. In the present practice of the invention capacitor 50g and resistor 50i are chosen such that NOR 50d provides an output for duration of time in the range 400 to 600 milliseconds.

NOR gate 36 is operative to conduct either the width modulated pulses from terminal 76z of pulse width modulator 76, ref. FIG. 7, or the Set, Resume signal from NAND 52ab of the Set Resume logic, as applied through terminals 50a and 50k of initial duty cycle generator, to one input terminal 38a of gate 38 and to one input terminal of a NOR logic device 38b. The remaining input of NOR 38b receives the output of NOR 58d, through output terminal 50e and input terminal 38e. NOR 38b is operative to conduct either the output of NOR 36 or NOR 50d through inverter amplifier 38c and through output terminal 38d to input terminal 40a of servoamplifier 40.

Input terminal 40a of servoamplifier 40 is connected to the base of first transistor 40b with the collector thereof connected through resistor 40c to the base of a second transistor 40d. The emitter of first transistor 40b is grounded through junction 40e which is also connected to diode 40g, poled as shown to junction 40f, and junction 40f is connected to the collector of second transistor 40d and also connected to output terminal 40h. The emitter of second transistor 40d is connected to junction 40i which is connected to input terminal 40j and receives power from a twelve volt source such as system supply 42, ref. FIG. 2. Junction 40i is also connected to a zener diode 40k, poled so as to be reversed-biased by the twelve-volt potential at junction 40i, with the opposite terminal of diode 40k grounded. In operation, as a pulse from gate 38 is received at the input 40a of amplifier 40, the potential to the base of first transistor 40b is raised causing the first transistor to conduct, thereby lowering the potential to the base of second transistor 40d causing same to conduct the pulses through junction 40f and output terminal 40h and through one of the leads in cable L2, ref. FIG. 1, to DUMP valve coil 12x in servoactuator 12.

Referring now to FIG. 10, the circuitry is illustrated for the counter, memory and digital-to-analog converter sections of the embodiment of FIG. 7. Counter 68 is a solid state integrated circuit 10-bit ripple-carry binary counter as, for example, RCA CMOS type No. CD 4037A. Preferably the output of the first six individual registers of counter 68a are applied to buffer 68b, and the output of the remaining four registers of counter 68a are applied to buffer 68c. Although any commercially available solid integrated circuit device may be utilized for the buffer 68b and 68c, RCA type No. CD4050 CMOS devices have been found particularly suitable.

The individual register outputs from buffer 68b and 68c are applied, respectively, to individual inputs of the digital-to-analog converter 70 which comprises a network of series resistors 70a and parallel resistors 70b, respectively, for each register stage. The resistors 70a and 70b are connected to a common junction illustrated typically at 70c and, for the first register stage, or least significant bit of counter 68b, the junction 70c is grounded through resistor 70b. The output of the digital-to-analog converter 70 is taken from the resistor junction 70e of the register stage corresponding to the most significant bit of counter 68a, and is applied to output terminal 70z.

The counter 68a has a Clock input 68d and a Reset or Clear input 68q. A source of timed pulses is provided in the form of an oscillator 66 comprising an integrated circuit multivibrator 66a in combination with a parallel capacitor 66b and parallel resistor 66c, thereby providing a tuned RC circuit. Resistor 66c and capacitor 66b are chosen to give the multivibrator a frequency of preferably 10 kilohertz with the output square wave signal from multivibrator 66a applied through output terminal 66d to one input of NAND logic gate 28, ref. FIG. 7. The output of gate 28 is applied to the Clock input terminal 68d of counter 68a.

Set logic 48, ref. FIG. 7, provides a signal through input terminal 68f to junction 63fg, which is connected to the input of inverter amplifier 68g; and, junction 68h is also connected to junction 68h, which junction is connected to one input of a NAND gate 68j and one input of NAND 68k. Junction 68i is connected to a second input of NAND 68k and to capacitor 68m which is grounded. A second input of NAND 68j is connected to junction 68n which is connected through resistor 68u to ground and also through capacitor 68na and junction 42a to a source of five volts such as system power supply 42, ref. FIG. 2. The output of NAND 68j is applied to the input of an inverter 68p, the output of which is applied to the Reset terminal 68q of counter 68a. The output of NAND 68k is applied to the input terminal 64a of latch 64. Latch 64 has a second input 64b connected to the output of counter stop comparator 62, which comparator is operative to conduct when the vehicle speed voltage $V_g$ applied to the negative input thereof, is less than the value of the voltage $V_{set}$ indicative of the desired set speed as applied to the positive input thereof. Latch 64 includes a pair of NOR gates 64c, 64d with the input terminal 64b applied to one input of NOR 64c and input 64a applied to one input terminal of NOR 64d, with the output of NOR 64d applied to junction 64e, also connected to a second input of NOR 64c, the output of which is fed back into a second input of NOR 64d. Junction 64e is also connected through output terminal 64f to junction 68r, connected to a second input of NAND 28, and also through series resistor 68s to input terminal 68t which is connected to junction 79, which is connected to the positive input of the counter stop comparator 62 and also to junction 80, which is connected to the output terminal 70z of the digital-to-analog converter 70.

Figure 11:
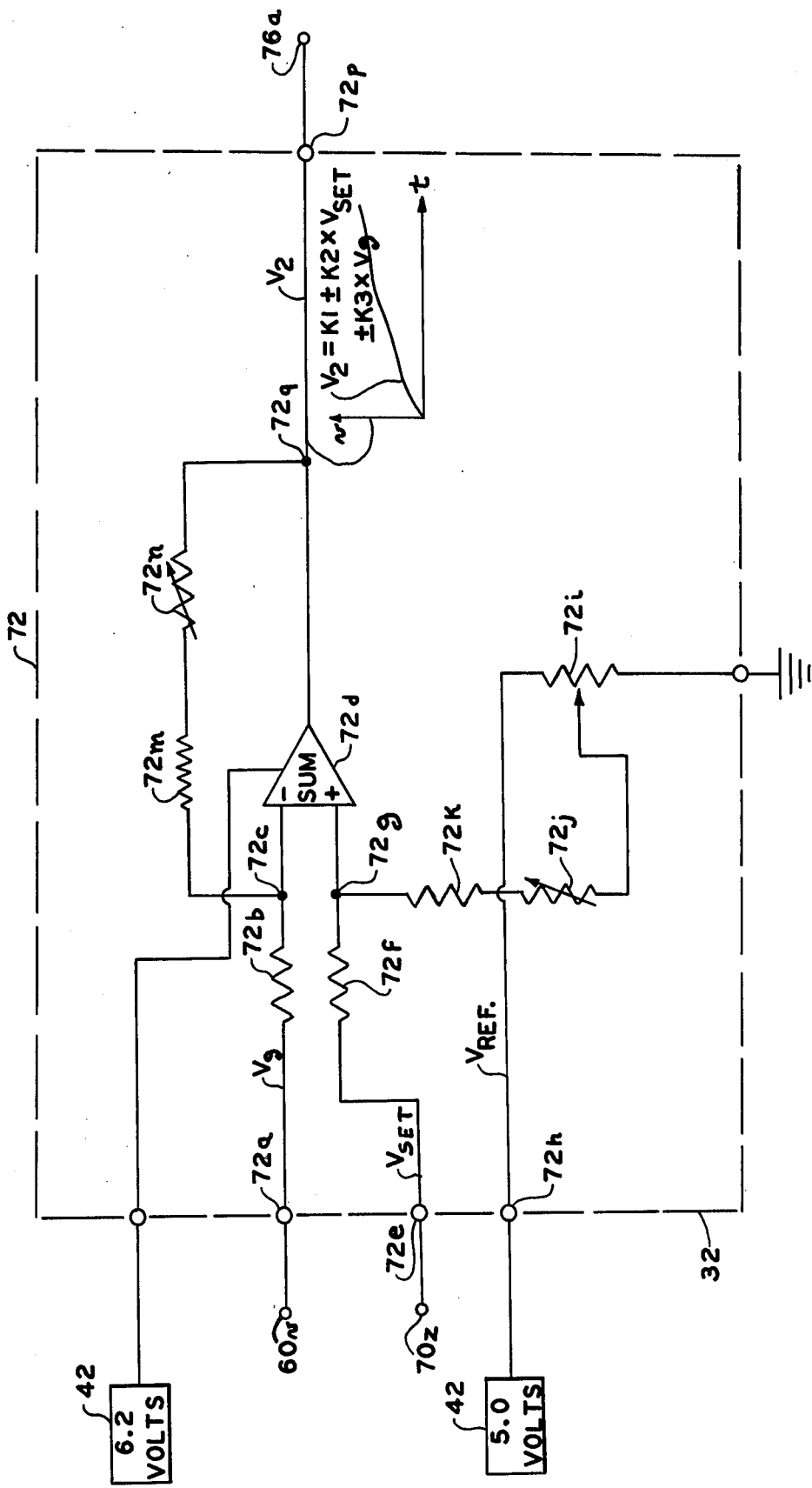
FIG. 11 is a logic block diagram and schematic of the arithmetic processor of the system of FIG. 7.

In operation, as set button 16a is pushed to activate the system and then released, the set logic 48 is operative to conduct a signal to inverter amplifier 68g and NAND devices 68j and 68k. Inverter 68g applies a negative voltage to junction 68i at a time when the signal at junction 68h and the opposite input of NAND 68k is positive. However, capacitor 68m delays the rise and decay time of the voltage at junction 68i such that, for a short period of time, a positive voltage is applied to both terminals of NAND 68k, which then conducts a pulse to the latch 64. Latch 64 is operative to emit an output signal at terminal 64f when no signal is being received from counter stop comparator 62, but a signal is received from NAND 68k. The signal from latch output 64f causes NAND gate 28 to conduct the output of oscillator 66 to the Clock terminal 68d of the counter 68. Counter 68 registers the number of pulses received from oscillator 66 and, as each successive register of the counter is activated, the output thereof, through network resistors 70a and 70b typically, causes a stepwise increase in voltage as more registers of the counter are rendered active. The voltage output at terminal 70z of the digital-to-analog converter thus increases in a stepwise manner as indicated at 70f, and this voltage, through junctions 80 and 79, is applied to the positive input of comparator 62 as the voltage $V_{set}$. When $V_{set}$ is equal in magnitude to the vehicle speed signal voltage $V_g$, applied at the negative terminal of comparator 62, comparator 62 goes to a logic-one state at the output, setting latch 64 and thereby causing NAND gate 28 to be rendered nonconductive and prevent the oscillator pulses from being applied to the Clock terminal of the counter 68. The counter 68 and the digital-to-analog converter 70 maintain the particular value of the set speed voltage $V_{set}$ at the junction 80 for application through terminal 72e to the arithmetic processor 72, ref. FIGS. 7 and 11.

As set button 16a is initially pushed, set logic 48 applies, through junction 68h, a pulse to NOR gate 68j which causes inverter 68p to apply a signal to the reset terminal 68q of counter 68a for resetting the counter to zero. Similarly, upon initial activation of system power supply 42 by turning on the vehicle ignition switch (not shown), a voltage signal at junction 68n is applied to one input of NOR 68j and through converter 68p to the reset terminal 68q of the counter 68a.

Referring now to FIG. 11, the circuitry is illustrated for the arithmetic processor 72, ref. FIG. 7, wherein a voltage $V_2$ is generated which has a magnitude proportional to values of the system governing expression:

$$V_2 = K_1 \pm K_2 V_{SET} \pm K_3 V_g.$$

The vehicle speed signal voltage $V_g$ from output 60v, ref. FIG. 8, is applied to the input terminal 72a through series resistor 72b to junction 72c with a lead therefrom connected to the negative terminal input of a linear summing amplifier 72d, which may be any commercially available solid state operational amplifier; however, a National Semi-Conductor Corporation, (2900 Semi-Conductor Drive, Santa Clara, California 95051) type LM2902 device has been found particularly suitable. A second input terminal 72e has connected thereto the signal $V_{SET}$ from the output 70z of the digital-to-analog counter 70, ref. FIG. 10, through a series resistor 72f and junction 72g, to the positive input terminal of amplifier 72d. Junction 72g also has applied thereto a reference voltage from a five-volt source such as power supply 42, ref. FIG. 2, through a third input terminal 72h and series dropping resistor 72i, preferably an adjustable resistor. The voltage from the wiper arm of resistor 72i is applied to junction 72g through series trim resistor 72j and series precision resistor 72k. The output of summing amplifier 72d is applied to junction 72q and is applied through series feedback resistors 72m, a precision resistor, and 72n, a trimming resistor, to the junction 72c also connected to the negative input terminal of amplifier 72d. The choice of resistors 72b, 72f, 72m, 72k and 72i determines the values of the coefficients $K_1$, $K_2$ and $K_3$ used in the system governing equation set forth above. Thus, the output voltage $V_2$, applied to output of junction 72fq from amplifier 72d, is proportional to the expression $K_1 + K_2 V_{set} + K_3 V_g$ and is applied to output terminal 72p of the arithmetic processors 72. The arithmetic processor 72 continuously performs a calculation of the expression for the system governing equation, and provides an output voltage $V_2$ proportional thereto. The manner and procedure for determining the particular values of the coefficients $K_1$, $K_2$ and $K_3$ of the system governing equation will be hereinafter described in detail with respect to calibration of the system 10.

Referring now to FIG. 12, the circuitry is illustrated for the DC voltage to width modulated pulse converter 34, ref. FIG. 2, which comprises a DC to pulse width modulator 76 and oscillator 78, ref. FIG. 7. The voltage $V_2$ from output terminal 72p of arithmetic processor 72, ref. FIGS. 7 and 11, is applied to an input terminal 76a of the pulse width converter 76 and to the negative input terminal of a pulse width comparator 76b. A linear saw-tooth wave signal 76c is applied to the positive input terminal of pulse width comparator 76b. The linear saw-tooth wave 76c is provided by alternately charging and discharging capacitor 76c connected between the positive terminal of amplifier 76b and ground via intermediate junctions 76d, 76df and 76cf. The pulse width comparator 76b receives 6.2 volt power through terminals 76e from system power supply 42, ref. FIG. 2. Capacitor 76c is in parallel with a switch 76f in the form of a field effect transistor device, as, for example, RCA type No. CD4007, which intermittently switches on or off to thereby permit charging of the capacitor or shunting of the capacitor causing same to discharge suddenly. The charging voltage to junction 76d is provided from the collector of transistor 76g which has the emitter thereof biased at preferably 6.2 volts from a source, such as system power supply 42, through input terminal 76h, and in series with resistors 76i and trimming resistor 76j. The base of the transistor 76g is biased, through junction 76m, which is connected to diode 76kn, poled as shown, through input terminal 76k to a five-volt supply, such system power supply 42. Junction 76m is also connected through resistor 76n to ground. The output of the pulse width comparator 76b is applied to cascaded inverter amplifiers 76bp and 76p with the output thereof applied to one input of NAND 76q. The remaining input of NAND 76q is connected to junction 76r, which is connected to the common terminal 76fc of switch 76f. A first normally open terminal 76fd of switch 76f is connected to junction 76d through junction 76df and a second normally open switch terminal 76fe is connected to junction 76cf also connected to capacitor 76c and to ground. The output of NAND 76q is applied to the input of a similar NAND logic device 76s, the output of which is applied to a junction 76t and is fed back to junction 76r for application to terminal 76fc of switch 76f and the input of NAND 76q thus forming a latch network. A second input of NAND 76s has connected thereto the output of a NAND 76u which has the inputs thereof connected to a source 78 of timed pulses. Pulse source 78 includes a multivibrator 78a which may be any convenient device having an alternating signal output in the range of 10 to 25 hertz, and preferably 16 hertz, as was mentioned with respect to the description of the preferred form of the flapper 12e in servoactuator 12. Any commercially available solid state multivibrator 78a may be used; however, and RCA CD4047 CMOS integrated circuit device has been found particularly suitable. As illustrated in FIG. 12, multivibrator 78a is electrically in parallel with capacitor 78b and resistor 78c, so chosen as to give the desired RC time constant to the oscillator 78. The output of oscillator 78 is applied through output terminal 78d and input terminal 78av to a junction 76v which has a lead connected therefrom to one input of NAND 76u and also a separate lead to the input of inverter amplifier 76w, the output of which is applied to junction 76x which has a lead applied to a second input of NAND 76u and also a lead connected to capacitor 76y which is connected to ground. In operation, the alternating signal from the oscillator 78, as applied to junction 76v, is supplied continuously to one input of NAND gate 76u and, as the signal goes positive, inverter 76w provides a negative potential to junction 76x thereby charging capacitor 76y. As the oscillator signal at junction 76v swings negative, the inverter amplifier 76w applies a positive potential to junction 76x, thus discharging capacitor 76y during the negative going portion of the signal at junction 76v. Thus, the signal from junction 76x applied to the second input of NAND 76u consists only of a series of positive going pulses. NAND 76u is operative to go to the logic one condition upon receipt of like positive signals at both inputs therof, and thus passes only a series of positive pulses of the same frequency as the oscillator signal. Upon receipt of a pulse from NAND 76u, NAND 76s which, in conjunction with NAND 76q, comprises a Set-Reset latch, is operative to have the output thereof go to logic zero upon receipt of the pulses from NAND 76u. A logic zero signal at output junction 76t of NAND 76s, junction 76r connected to the input of NAND 76q and switch terminal 76fc, causes switch 76f to close momentarily to discharge capacitor 76c, thus providing a negative potential at junction 76d for producing the saw-tooth waveform 76c. Comparator amplifier 76b compares the value of the DC voltage $V_2$ at the negative input thereof with the linear ramp voltage of the saw-tooth wave and the amplifier conducts during each cycle of the saw-tooth voltage for a time when the value of the linearly increasing saw-tooth voltage exceeds the instantaneous value of $V_2$. Thus, for varying values of the voltage $V_2$, the linearly increasing saw-tooth voltage will exceed the DC voltage $V_2$ for different lengths of time during each period of the saw-tooth voltage, and comparator 76b will conduct, for a period time during each cycle of the saw-tooth wave, directly proportional to the length of time that the DC voltage $V_2$ is exceeded by the saw-tooth waveform 76c. The output of comparator amplifier 76f will thus be a series of DC pulses of constant amplitude having the width of each pulse varying in accordance with instantaneous values of the DC voltage $V_2$ from the arithmetic processor 72. The frequency of the output pulses 76dk from comparator 76b will be the same as the frequency of the saw-tooth waveform 76c.

The signal from oscillator 78 comprises a square wave form 76d as applied to junction 76v and NAND 76u. The inverted form of wave 76d from the output of inverter 76w is applied to junction 76x as described above. The capacitor 76y is so chosen as to delay the increasing and decreasing of the voltage waveform 78d so that, when the inverted waveform 76d from junction 76x and the positive waveform from junction 76v are applied simultaneously to the inputs of NAND 76u, the delay in rise and decay of the inverted voltage waveform produces a short period of time during which both inputs of NAND 76u are in logic one condition and NAND 76u thus conducts to produce an output in the form of very short duration voltage pulses 76xs typically of the order of magnitude of 10 microseconds in width, which pulses 76xs are applied to the second input of NAND 76s.

When comparator amplifier 76b conducts to one input of NAND 76q, a DC pulse having width proportional to governing equation voltage V2, NAND 76q and 76s are Set, as a latch, in a known manner and hold the value of the particular pulse until the timing pulse 76xs is received from NAND gate 76u at the input terminal of NAND 76s, thereby causing NAND 76s to conduct to junction 76t and to output terminal 76z of the pulse width converter 76. The output of the converter 76 thus has the waveform comprising a series of DC pulses 76tz with width proportional to instantaneous values of the governing equation voltage $V_2$ and has a frequency equal to that of the oscillator waveform 78d. The width of each of the pulses 76tz represents the ON-time $T_{on}$ of the flapper coil 12x, of servoactuator 12, ref. FIGS. 3, 4 and 5.

SYSTEM CALIBRATION

From the foregoing description it will be seen that the circuitry of the present system generates a voltage $V_{SET}$ proportional to the desired set speed and stores such voltage in memory, and continuously compares this voltage with the speed signal $V_g$ from the tachometer generator. A third voltage V2 is generated having values in accordance with a system governing equation:

$$V2 = K_1 + K_2 V_{SET} + K_3 V_g$$

The output voltage V2 is converted to a series of DC pulses having the width of individual pulses varied in proportion to instantaneous values of V2. The DC pulses are then synchronized with the output of an oscillator to have the desired frequency and are then applied to the coil 12x of servoactuator 12 for alternating the flapper valve 12e, ref. FIGS. 3, 4 and 5. The flapper 12e controls the vacuum in the vacuum chamber 12b which causes movement of the diaphragm for controlling the vehicle throttle.

Figure 13:
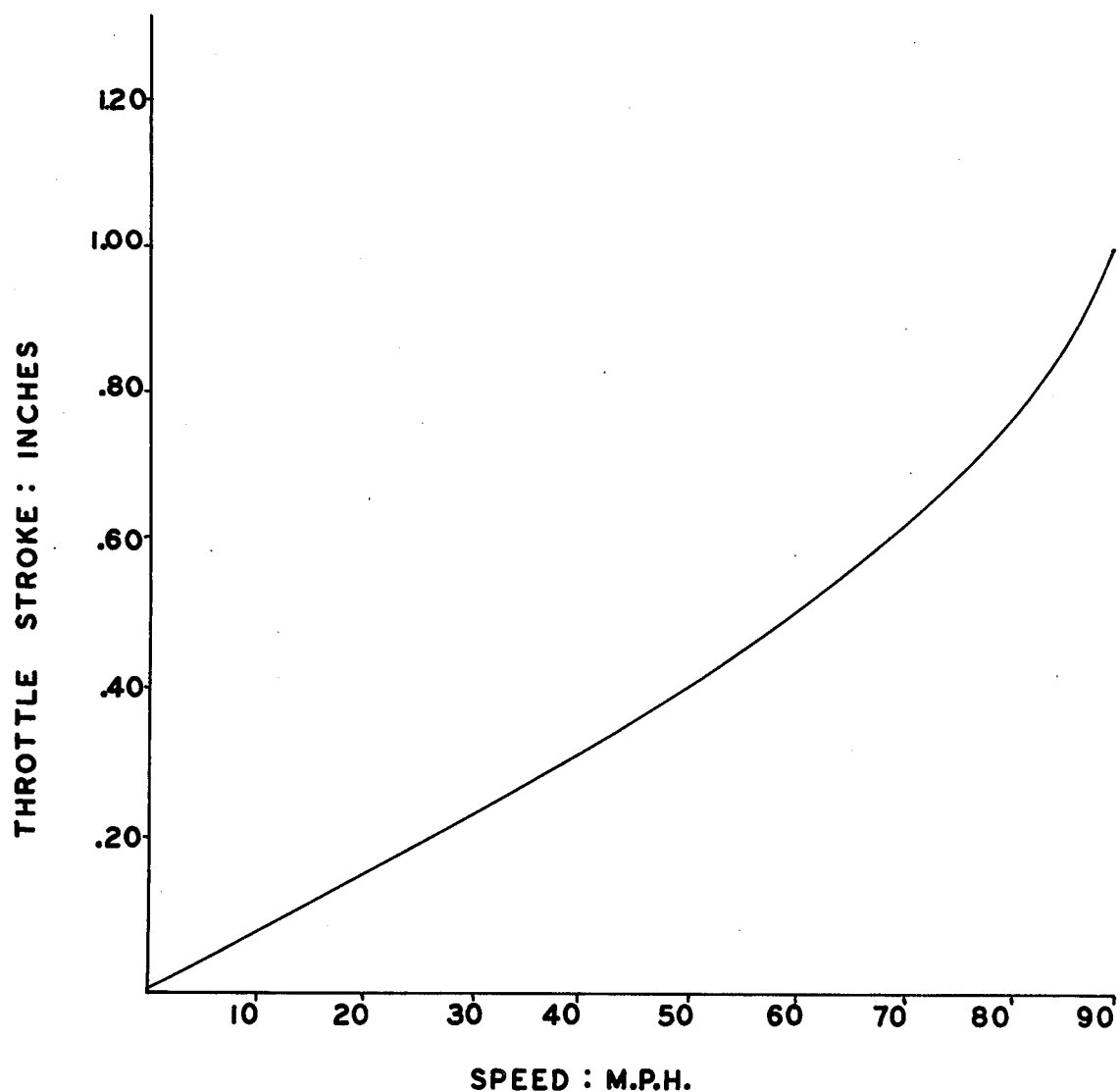
FIG. 13 is a typical graph of throttle actuator stroke plotted as a function of speed for a given vehicle.

With reference to the above description, the determination of the coefficients K1, K2 and K3 for calculation of the voltage V2 in accordance with the system governing expression will now be described. In order to determine the proper pulse width $T_{ON}$, 76tz in FIG. 12, for controlling the flapper driving coil 12x, it is necessary to obtain the throttle response of the particular vehicle. Accordingly, measurements of the vehicle throttle movement versus road speed are taken and the values plotted graphically as a function of vehicle speed similar to the graph shown in FIG. 13. The maximum throttle stroke for the upper limit of the regulated speed range is determined from such a graph as, for example, FIG. 13, and this value of maximum throttle stroke is then used to enter a graph of servoactuator response as, for example, FIG. 6, where diaphragm, or throttle, stroke is plotted as a function of the corresponding required pulse ON-time $T_{ON}$. For the particular vehicle throttle response shown in FIG. 13, a maximum throttle stroke of one inch was determined to be sufficient to operate the vehicle within the desired regulated speed range of 90 miles per hour maximum and 30 m.p.h. minimum. From such a graph as FIG. 6 it is determined that a pulse ON-time $T_{ON}$ of 28 milliseconds is required to provide the necessary one inch throttle stroke. The maximum value of pulse width $T_{ON}$ is then equated to the system governing expression K1 + K2 $V_{SET}$ + K3 Vg and the expression $T_{ON} = K1 + K2 V_{SET} + K3 V_g$ is then solved for the coefficients K1, K2 and K3 at $V_{SET} = V_g$ using additional known relationships as will be hereinafter described. From vehicle dynamic testing, is has been found particularly suitable to utilize a coefficient K3 = 8.0 for the system governing equation for automotive vehicles in the 4,000 to 5,000 lb. weight class with presently available power plants. For the initial calculation of the coefficients it will be understood that the determination of the constants K1, K2 and K3 is an iterative process and the value of 8.0 serves as convenient first approximation. The value of K2 is determined from the expression $V_{SET} = K2 T_{SET}$ where $T_{SET}$ is the throttle stroke corresponding to $V_{SET}$, as determined from the vehicle throttle response curve as, for example, FIG. 13. With the values of K2 and K3 having been obtained in the above manner, the value for K1 is then obtained by rearranging and solving the above equation for $T_{ON}$.

It will be apparent from the above description that the degenerate form of the governing equation, i.e., where $K_2 = K_3$, would render the present invention inoperative. Since $K_2$ and $K_3$, as explained above, are determined for a given set speed and the aforementioned condition of $V_{SET} = V_g$, or zero speed error, the constants thus determined clearly must yield a $T_{ON}$ in accordance with the curve of FIG. 6 in order to yield, for a given set speed, the same vechicle throttle deflection of FIG. 13 for proper control. Thus, it is seen that $T_{ON}$ is different for different set speeds within the control range in the present invention, as opposed to $T_{ON}$ being a constant for all given set speeds, e.g., where $K_2 = K_3$.

Referring now to FIG. 11, the choice of the resistors 72m, 72n; 72b, and 72f; 72k and 72j, will be described with reference to the previously determined coefficients K1, K2 and K3. It will be apparent that the voltage $V_{SET}$ from input terminal 72e is dropped across resistor 72f and applied to junction 72g, which junction is also biased by an amount proportional to the reference voltage $V_{REF}$ from input terminal 72h, as dropped across resistors 72i, 72j and 72k. Thus the expression for the coefficient K2 may be written as $K2 = (R_{72m}/R_{72f}) \times V_{SET}$, or $R_{72m} = K2 \times R_{72f} \times V_{SET}$. Similarly, the coefficient K3 may be expressed as $K3 = V_g (R_{72m}/R_{72b})$ or $R_{72m} = K2 \times (R_{72b}/V_{SET})$. The cofficient K1 is obtained from th expression $K1 = (R_{72m}/72K) V_{REF\ 72i}$ or, rearranging terms, $R_{72i} = (R_{72m}/K1) \times V_{REF\ 72i}$ where $V_{REF}$ is the voltage at the wiper of $R_{72i}$. Thus, after the coefficients K1, K2 and K3 have been determined, by the above-described procedure, the values of the feedback resistor $R_{72m}$, the input resistors $R_{72b}$, $R_{72f}$ and the bias resistor $R_{72k}$ may be determined. The voltage adjustment resistor 72i may be chosen at any convenient value depending upon the choice of the amplifiers 72d and the reference voltage $V_{REF}$ at input terminal 72h. However, for the particular commercial amplifier 72d described above, and for $V_{REF}$ of 5.0 volts, it has been found convenient to use a value of 10 ohms for resistor 72i. Furthermore, the above-described expressions for determining the values of the feedback resistor 72m, input resistors 72b, 72f, and bias input resistor 72k are based on the assumption that the input resistor 72b and 72f are of equal value, and that the bias resistor 72k and feedback resistor 72m are of several orders of magnitude greater than the input resistor 72b, 72f.

In the above procedure and expressions for determining the coefficients K1, K2 and K3, neglecting the resistance due to the trimmer resistors 72n in the feedback loop and resistor 72j in the reference voltage loop, it has been found convenient to utilize one megohm adjustable resistors for 72n and 72j. The above-described procedure for determining the values of the input and feedback gain resistors for use with amplifier 72d provide approximations for a first choice, and it will be understood that adjustment of the trimmer resistors will be required before the system will hold a set speed within the desired plus or minus one-half mile per hour tolerance band without oscillating or hunting about the SET speed. Thus the actual choice of the values of the resistors will be confirmed by road testing for any particular model vehicle.

DIGITAL CIRCUITRY EMBODIMENT

Figure 14:
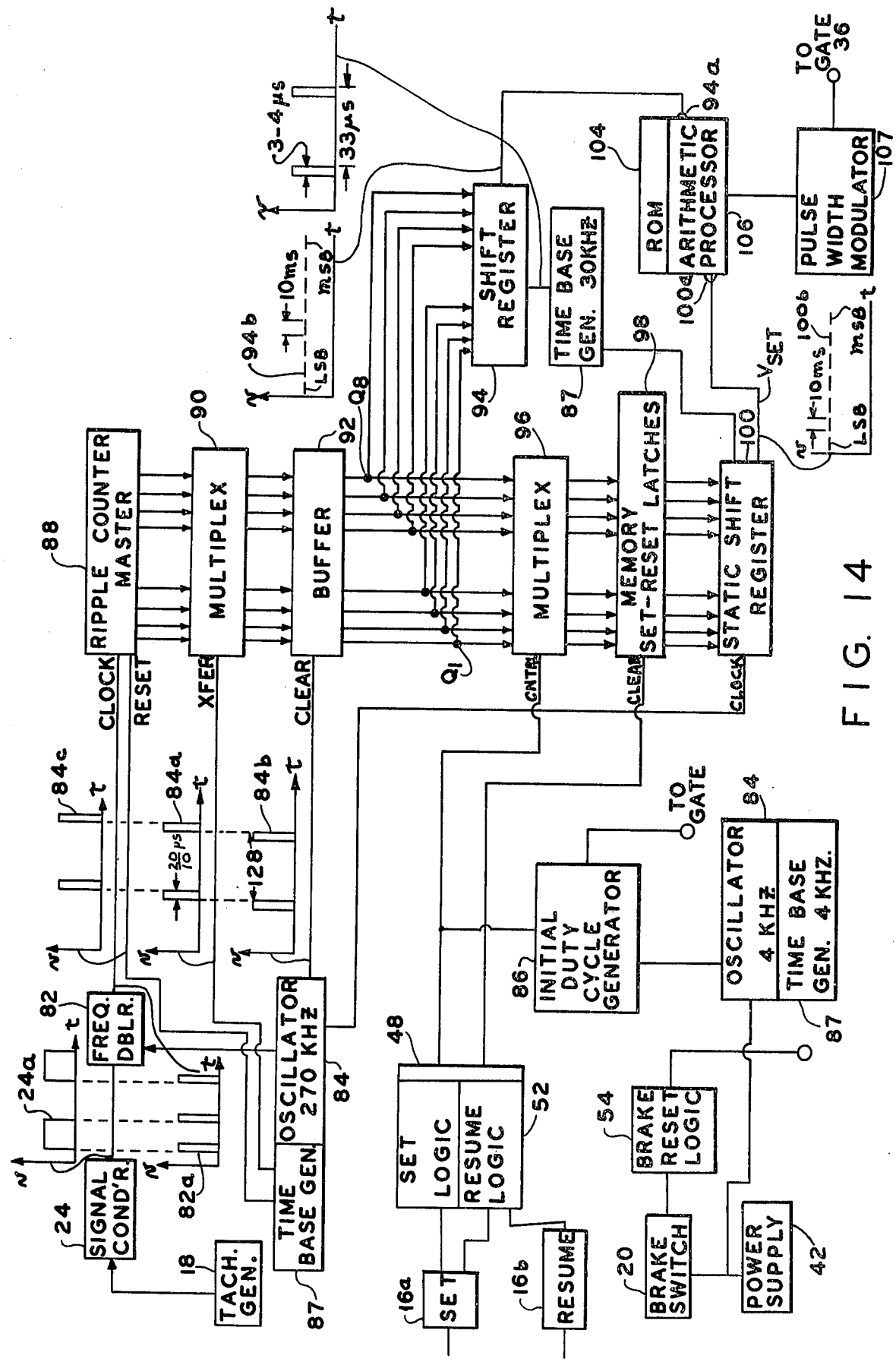
FIG. 14 is a block diagram of another embodiment of the system of FIG. 2 utilizing substantially all-digital circuitry for generating the electrical control signal.
Figure 15:
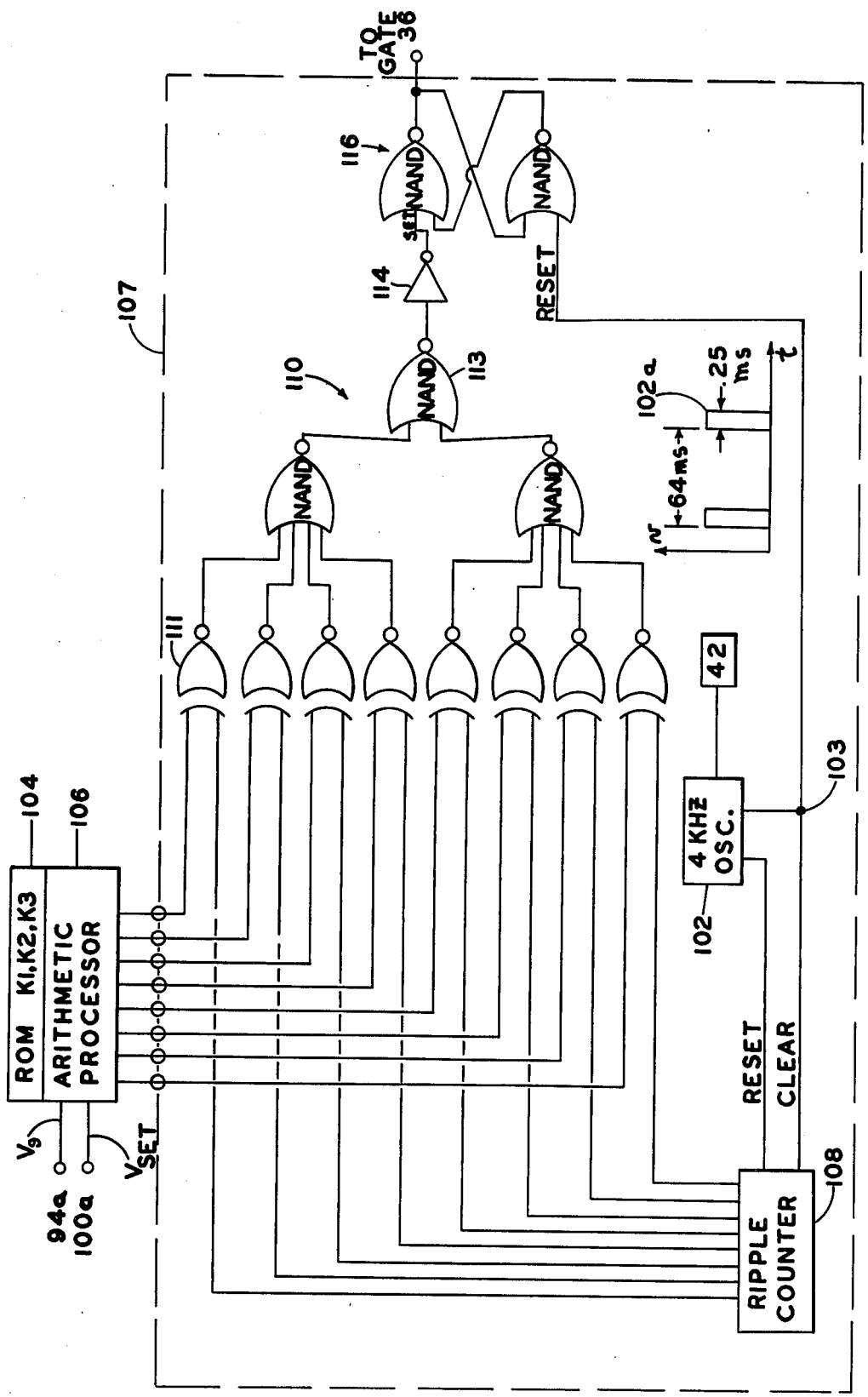
FIG. 15 is a block diagram of the digital pulse width modulator of the embodiment of FIG. 14.

With reference to FIGS. 14 and 15, the block diagram for another embodiment of the invention of FIGS. 1 and 2 is illustrated wherein digital counting techniques are employed for producing width modulated pulses for controlling the servoactuator 12. The embodiment of FIG. 14 utilizes, where possible, components common to FIG. 2 and similar reference numerals have been used to indicate similar components. In the embodiment of FIG. 14, the series of DC pulses 24a from signal conditioner 24 are applied to the input of a frequency doubler gate 82 with a separate input of doubler 82 having applied thereto a series of timing pulses from a source 84. The source of pulses 84 is preferably in an oscillator having a relatively high frequency, in the order of at least 10 times the frequency, at maximum expected road speed, of the pulses 24a from the signal conditioner and, in the present practice, preferably 270 kilohertz. The oscillator 84 also supplies high frequency pulses to a time base generator 87, the output of which provides timing pulses for clocking the counter, multiplexer and buffer.

Figure 17:
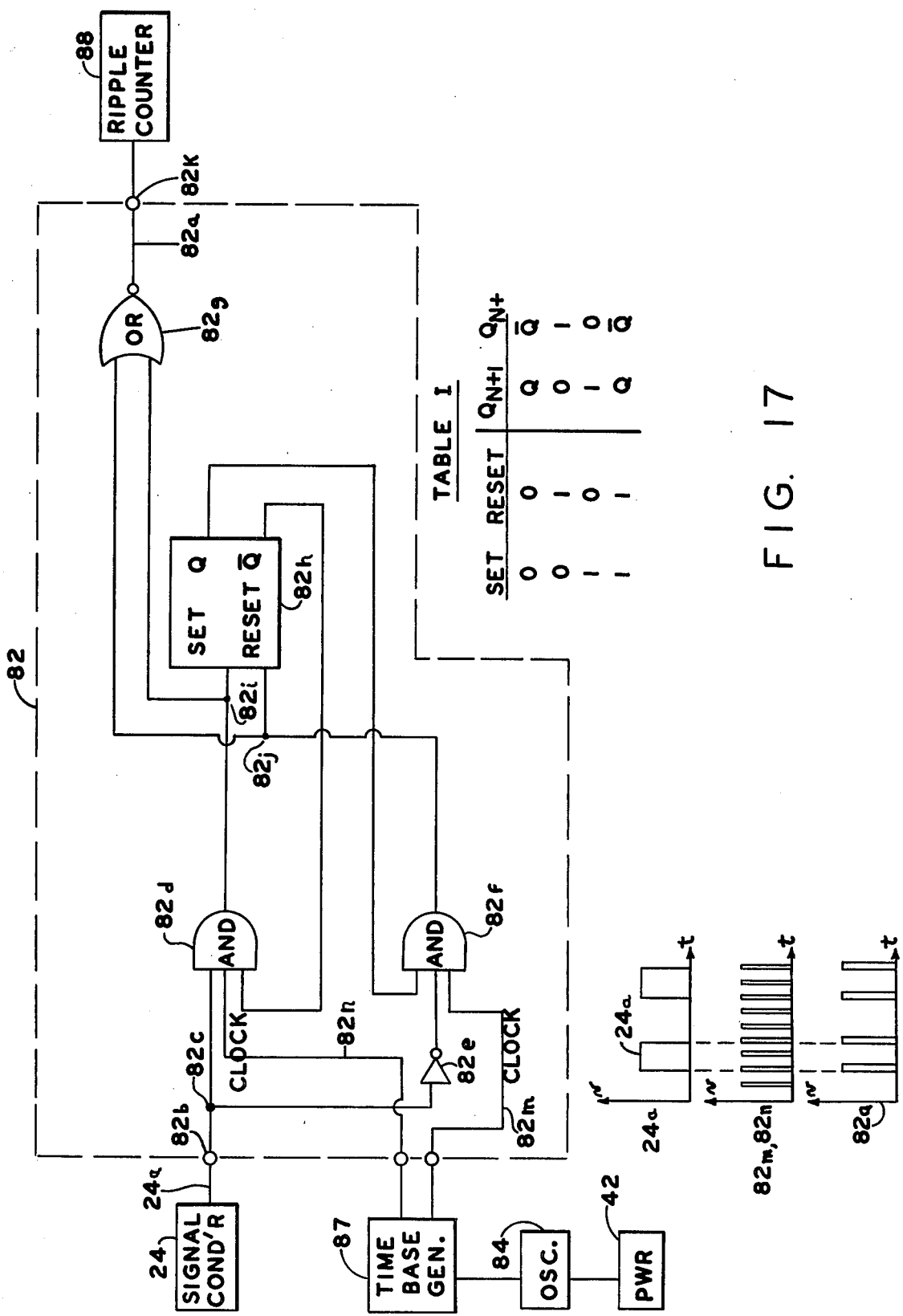
FIG. 17 is a block diagram of the frequency doubler of the embodiment of FIG. 14.

Referring now to FIG. 17, a block diagram of the frequency doubler 82 is illustrated wherein the signal 24a from the tachometer signal conditioner 24 is received through an input terminal 82b and through junction 82c to an inverter 82e, the output of which is applied to one input of an AND device 82f. Junction 82c is also connected to one input of a separate AND device 82d. A source of timing pulses 82n, 82m is provided as, for example, from time base generator and oscillator 84, and the pulses 82n, 82m are applied respectively to separate inputs of AND devices 82d and 82f. The output of AND device 82d is applied through junction 82i to one input of an OR device 82g, and is also applied to the SET input of a SET-RESET latch 82h. The output of AND device 82f is applied through junction 82j to a separate input of OR 82g and is also applied to the RESET input of SET-RESET latch 82h. The positive output Q of latch 82h is fed back to a separate input of AND device 82f, and the inverted output Q is fed back to a separate input of AND device 82d. In operation, the latch 82h functions in accordance with the truth table set forth in Table I illustrated in FIG. 17.

In operation, as the positive going portion of pulse signal 24a is received at input terminal 82b and a timing pulse 82a is received at the inputs of AND devices 82d and 82f respectively, the AND devices are operative the conduct for the duration of the timing pulse 82a until the timing pulse goes to zero. This occurs each time that the tachometer signal 24a changes state, resulting in a waveform 82a of a series of pulses having a frequency approximately twice that of the tachometer generator signal 24a. The pulses 82a are applied to output terminal 82k which is connected to the input of ripple counter 88, ref. FIG. 14.

Upon receipt of the pulses from source 84, doubler 82 is operative to conduct for a limited period of time, preferably in the order of voltage pulses 82a to the Clock input of ripple counter 88 causing the counter 88 to register for the duration of time in which it is operational by application of the voltage pulse 82a. The output of ripple counter 88 is applied in parallel format to the multiplexer 90 which also receives, at a separate Control input thereof, a series of timing pulses 84a from source 84, which pulses 84a are of a very short time duration, of the order of ten to twenty microseconds, and coincide on decay with the trailing edge of the pulses 82a emitted from doubler 82 as shown by the voltage-time diagrams in FIG. 14. Upon receipt of a timing pulse 84a, the multiplexer 90 is operative to transfer in parallel binary format, the count accumulated by counter 88 to a buffer 92, which buffer receives, at the Clear input thereof, a third set of timing pulses 84b from time base generator 87, which pulses 84b are followed on decay of rise with the trailing edge thereof by the pulses 82a such that the pulses 84b, l also of short duration in the order of 10 to 20 microseconds, are operative to clear the buffer 92 in preparation for the transfer of a new count from multiplexer 90. Separate timing pulses 84c are provided from time base 87 to the RESET input of counter 88 and the timing pulses 84a, 84b, 84c are respectively in serial sequence as shown by the respective waveforms in FIG. 14. The frequency of the timing pulses 84a, 84b and 84c must be chosen such that the counter 88 is in the counting mode for a period of time sufficient to encompass at least one complete cycle of data pulses from the doubler 82, and, in the present practice, the pulses 84a, 84b and 84c are preferably spaced 128 milliseconds apart. Thus the circuit arrangement of FIG. 14, by providing a speed signal 82a to the counter 88 of twice the frequency of the tachometer generator signal 24a, thus enables the counter to resolve road speed to an accuracy of one-half m.p.h. The output of buffer 92 is applied in parallel binary format to a shift register 94 which receives, at a separate input, any convenient timing or Clock pulse from source 87. Shift register 94 is operable, upon receipt of a Clock pulse form oscillator 84, to transfer the accumulated count from buffer 92, in serial format indicated at 94b in FIG. 14, to an input 94a of arithmetic processor 106, ref. FIGS. 2 and 15. The ripple counter 88, multiplexer 90 and buffer 92 may be of any suitable commercially available solid state integrated circuit devices having eight-bit register capacity as known in the art.

The eight-bit parallel binary output of buffer 92 is also applied, through junctions Q1 through Q8, respectively, to the input of a second multiplexer 96, which has a separate Control timing input which is connected to junction 85 which is connected to the output of SET logic 48, as for example, ref. FIG. 9, to output terminal 52ab or junction 52ac to receive the pulses from NAND 52ab. Upon activation of the SET switch 16a, multiplexer 96 transfers, in parallel format, the count from buffer 92 to Set-Reset latches comprising memory 98 having a separate input for a memory-Clear pulse from output of SET logic 48 as, for example, ref. FIG. 9, the output of NOR 52j as applied through output terminal 52m such that, upon pushing of SET button 16a, a pulse is received at the Clear input of memory 98 to reset the memory to zero. The output of each register of memory 98 is applied in parallel binary format to the inputs of a second static shift register 100 which also receives a controlled timing or Clock input signal at a separate input thereof from time base generator 87. Shift register 94 also receives timing pulses from time base generator 87 such that shift registers 100 and 92 are synchronized. Thus, upon activation of SET switch 16a, multiplexer 96 is operative to transfer the count of buffer 92 to the memory unit 98 for application continuously to shift register 100 which is clocked to apply, in serial format, the count representing the speed of the vehicle, at the time the Set button is released, as a series of constant amplitude DC pulses 100b to a separate input 100a of arithmetic processor 106.

With reference to FIG. 15, arithmetic processor 106 includes a read-only memory, ROM, 104 permanently programmed with the values of coefficients K1, K2 and K3, determined in the manner as described above, with respect to the embodiment of FIG. 7, which ROM is clocked to produce an output in accordance with timing pulses received from source 102, preferably a 4 KH$_z$ oscillator. The arithmetic processor 106 is permanently programmed to calculate the function:

$$V_2 = K_1 + K_2 V_{SET} + K_3 V_g$$

and provides an output in the form of a parallel format binary number proportional to the output pulse width $T_{ON}$ desired for operating the alternating means 12e of servoactuator 12, ref. FIGS. 3 and 4. Arithmetic processor 106 may be any suitable solid state device but is preferably a custom design integrated circuit device known as a micro processor which may be preprogrammed to calculate the output pulse width $T_{ON}$ in accordance with the system governing equation, as set forth above. Such a device is available from Intel Corp., 365 Middlefield Road, Mountain View, California, in a form fabricated to perform the arithmetic calculations in a manner hereinafter described.

Figure 18:
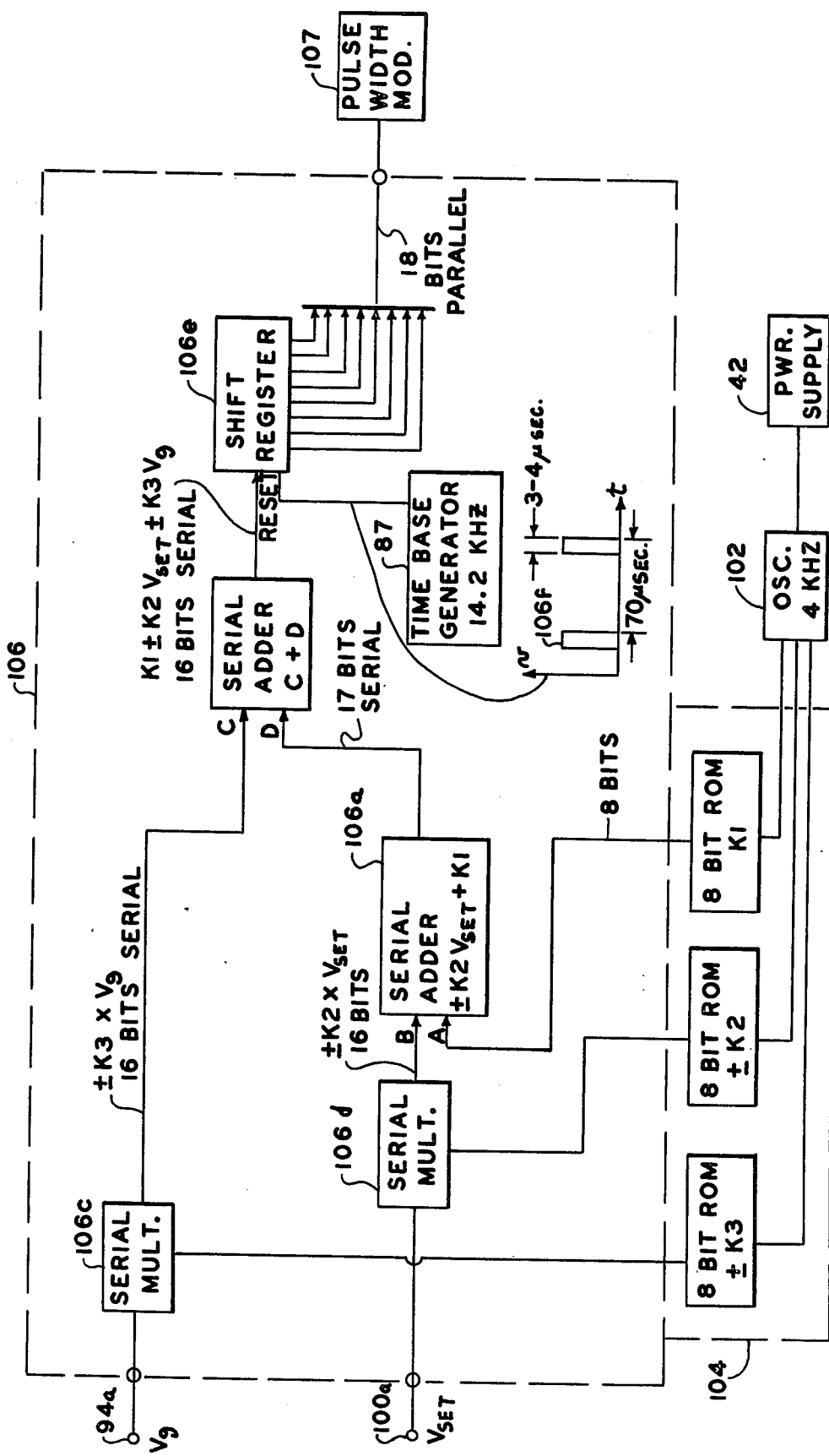
FIG. 18 is a functional block diagram of the logic of the arithmetic processor of the embodiment of FIG. 14.

Referring now to FIG. 18, a block diagram is shown for the arithmetic processor 106 and Read Only Memory (ROM) 104 of FIG. 14. The processor 106 receives binary inputs from ROM 104 for the values of the coefficients K1, K2 and K3, respectively and is operative to perform the calculations in accordance with the system governing equation set forth above by performing serial multiplication of the binary vehicle speed signal $V_{g1}$ as applied to input terminal 94a, reference FIG. 14, with the value of K3 received from ROM 104. Similarly the binary value for $V_{SET}$ in serial form is applied to input terminal 100a, reference FIG. 14, and is multiplied serially by the binary value from the ROM for coefficient K2 and this product is added serially in adder 106a to the binary value of coefficient K1, as supplied in binary serial form from ROM 104. The sum from adder 106a is then added serially in adder 106b to the product of the speed signal $V_g$ and coefficient K3 previously obtained by serial multiplication in multiplier 106c.

With reference to FIG. 14 and FIG. 18, it will be seen that the binary values applied at terminals 94a and 100a are in eight bit serial format and are multiplied by eight bit serial numbers from the ROM 104 representative of values of the coefficients K1, K2 and K3. The resultant products of this serial multiplication are sixteen bit serial binary representations which are applied to the inputs respectively of serial adders 106a and 106b. The output of serial adder 106a results in a seventeen bit binary number, and the output of serial adder 106b contains an eighteen bit serial binary representation which is applied to the input of a shift register 106e, the output of which gives a binary parallel format for the value of the system governing expression $K1 \pm K2 \times V_{SET} \pm K3 \times V_g$. Shift register 106e is operated by timing pulses 87a from a source such as time-based generator 87, the pulses 87a in the form shown in FIG. 18, having a pulse duration of 3 to 4 microseconds and a period of 70 microseconds or a frequency of approximately 14.7 kilohertz. The 18 bit parallel format output of shift register 106e is applied to the input terminals respectively of pulse width modulator 107 illustrated in FIG. 15.

Figure 19:
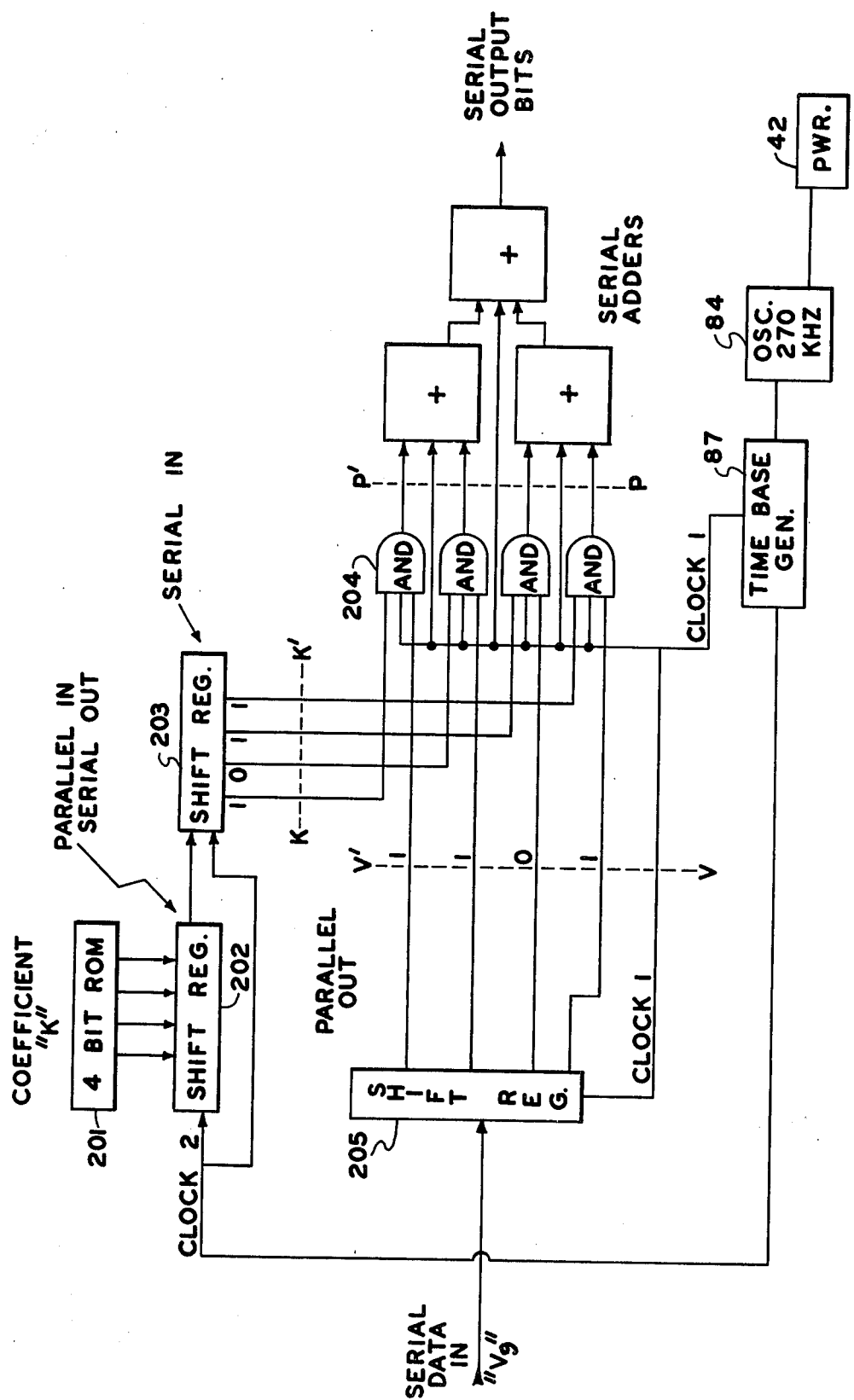
FIG. 19 is a block diagram of the logic for the calculations performed by the arithmetic processor of FIG. 18.
Figure 20:
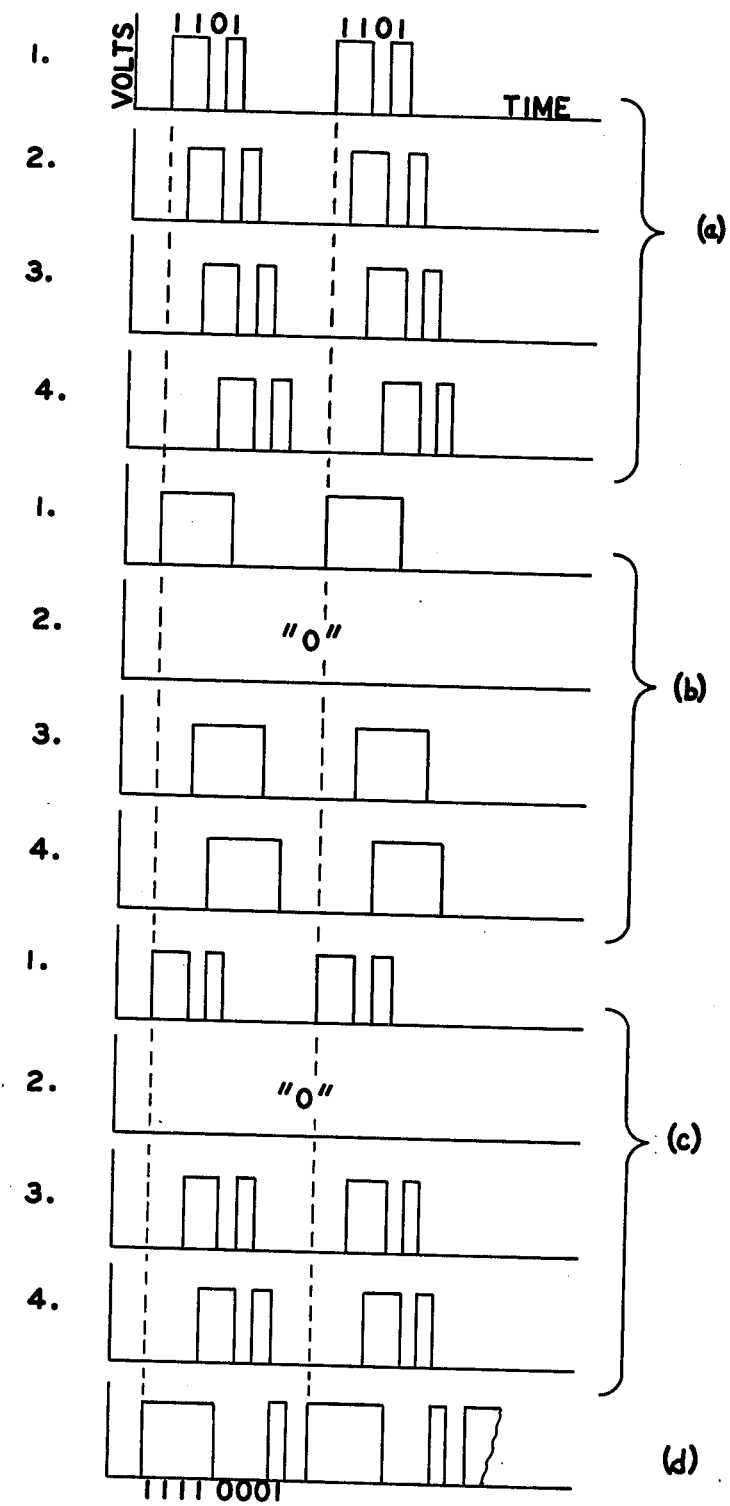
FIG. 20 illustrates the pulse waveforms taken at various stations of the block diagram of FIG. 19 for a sample calculation.

Referring now to FIG. 19, for the logic for a sample multiplication performed in the manner utilized for the serial multiplication of the arithmetic processor of FIG. 18 is illustrated in block diagram form. For convenience of illustration, the sample calculation is performed with four bit binary serial input data for the speed signal $V_g$ and a four bit binary parallel representation from the ROM, where the value of the coefficient K from ROM 201 is applied to a shift register 202 in parallel format and is conducted therefrom in serial format to one input of a second shift register 203. The shift registers 202 and 203 each have a clock signal applied thereto from a source such as time base generator 87 and oscillator 94, ref. FIG. 14. Upon receipt of a timing pulse from the generator 87, shift register 203 is operative to conduct the value of coefficient K from ROM 201 and shift register 202 with each bit applied respectively to a separate input of a plurality of AND gates 204. Shift register 205 also receives a series of timing pulses from the time base generator 87 which is synchronized with timing pulses applied to each of the separate inputs of the AND gates 204. In the present practice of the invention the timing pulses applied to shift registers 202 and 203 have a frequency of approximately 0.4 of the frequency of the timing pulses supplied to shift register 205 and AND gates 204. The output of shift register 205 is in parallel binary format and is applied from each register thereof to a separate input of respectively one of the AND gates 204. The output of the AND gates 204 are applied in pairs respectively to inputs of serial adders which are paired and clocked with the shift register 205 and thus provide a binary representation of the product of the coefficient k and $V_g$ in serial eight bit output format. For the purposes of illustration, a sample multiplication using a value of a coefficient K equal to the binary number 1011, decimal number 11, and a value of 1101 in binary, decimal 13, for the speed signal $V_g$ is described. Using these values for $V_g$ and K, the waveform outputs of shift register 203 taken along line K'—K' of FIG. 19 are illustrated in FIG. 20a for each register respectively of the shift register 203, which figure illustrates the pulse form representation of the binary number 1101 (decimal 13). The waveforms of the output pulses from shift register 205 taken along indicating line V'—V' of FIG. 19 are illustrated in FIG. 20b wherein the binary number 1011 (decimal number 13) is represented by the series of pulses from the respective output registers of shift register 205. FIG. 20c shows the waveform of the pulses from, respectively, each register of AND gates 204 as found along P—P' of FIG. 19; and, FIG. 20d illustrates the completed pulse waveform representation of the binary product 1111001 (decimal 143) in serial format. It will be understood that the technique of serial multiplication illustrated in the sample calculation of FIGS. 19 and 20 has been simplified by using four bit input information for convenience of illustration and is representative of the technique employed for calculations utilizing the eight bit input data for the logic of the embodiment of FIG. 18.

The output of each register of arithmetic processor 106 is applied respectively to an input of pulse width modulator 107 which includes a plurality of Exclusive-OR logic devices illustrated typically at 111 each having one input thereof connected respectively to one register output of arithmetic processor 106. The remaining input of each Exclusive-OR device 111 is connected respectively to one register output of an eight-bit ripple counter 108. The outputs of Exclusive-OR 111 are connected, in groups of four, to respectively separate inputs of a pair of quad input NAND logic devices 112, the outputs of which are connected to the inputs of a single NAND logic device 113.

Ripple counter 108 has the Reset and Clear timing inputs thereof connected respectively to the output of a source of timing pulses 102 in the form of an oscillator having an output frequency of, preferably, 4 kilohertz.

The output pulses 102a applied through junction 103 to the Clear input of counter 108 have a pulse width of preferably 0.25 milliseconds. and have a period of 64 milliseconds. The source of timing pulses 102 preferably also provides timing pulses to ROM 104 as shown in FIG. 18. In FIG. 15, the output of NAND 113 is applied, through an inverter amplifier 114, to the set SET input of NAND latch 116 which has the RESET input thereof connected to the source of timing pulses 102a with the output of NAND latch 116 applied to the input of gate 36, ref. FIG. 2.

Figure 16:
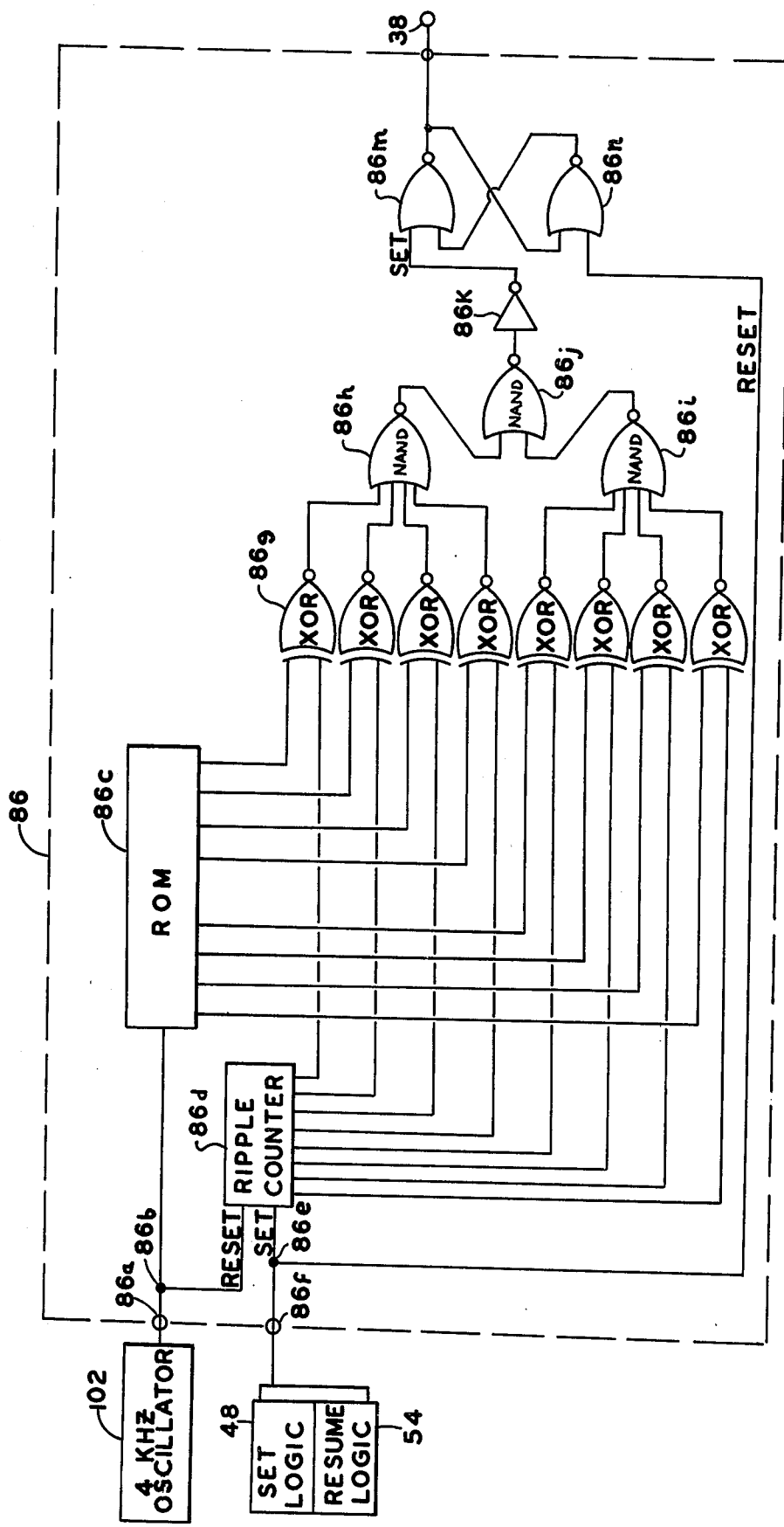
FIG. 16 is a block diagram of the initial duty cycle generator of the embodiment of FIG. 14.

In the embodiment of FIG. 14, the Initial Duty Cycle Generator 86 as illustrated in FIG. 16 is of the digital counter type and receives inputs from SET logic 48 also connected to the control input of multiplexer 96 through the output terminal 52ad, ref. FIG. 9, of the SET logic. The initial duty cycle generator 86 also receives a timing pulse from a source of timing pulses such as oscillator 102. The output of the initial duty cycle generator 86 is applied to the input of gate 38, ref. FIG. 2.

Referring now to FIG. 16, the logic diagram for the Initial Duty Cycle Generator 86 is illustrated and is similar to the logic of output pulse width modulator 110 with input timing pulse from a source 102 received through input terminal 86a, through junction 86b, to the control input of a Read-Only Memory ROM, 86c and also to the RESET input of a ripple counter 86d. Ripple counter 86d comprises an eight register counter and has the SET input thereof connected through junction 86e and input terminal 86f to the output of the SET-RESUME logic 52, 54 through junction 52ad, ref. FIG. 9. The output of ROM 86c is applied in parallel binary format from each of the eight registers thereof respectively to one input each of a plurality of Exclusive OR devices 86g, with the output of each corresponding register of ripple counter 86d applied to respectively the remaining of the appropriate one of Exclusive-OR devices 86g. ROM 86c receives timing pulses from source 102 continuously through junction 86b as does ripple counter 86d. Upon the receipt of a signal from either the SET or RESUME logic through junction 86e, ripple counter 86d is activated and begins to count the timing pulses from the source 102. When the count from ripple counter 86d as applied to the respective inputs of Exclusive-OR devices 86g is equal to the preprogrammed output of ROM 86c, Exclusive-OR devices 86g are operative to conduct through NAND devices 86h, 86i and 86j and through inverter amplifier 86k to a pair of NAND devices 86m and 86n connected with feedback so as to form a latch. The output of amplifier 86k is applied to the SET input of the latch with the RESET input thereof connected to the output of SET-RESUME logic through a junction 86e. In operation, the latch comprising NAND devices 86m and 86n is operative to conduct the output of the ripple counter 86d only during the period of time in which the ripple counter 86d is counting to the predetermined value stored in the ROM 86c. When the output of the counter 86d reaches the count of ROM and activates Exclusive-OR devices 86g and NAND gates 86h, 86i and NAND gates 86j, the output latch comprising NAND's 86m and 86n is then turned OFF to prevent further application of the output of ripple counter 86d to gate 36.

Although the above-described logic and circuitry for providing the electrical control pulses for the initial duty cycle and for the vacuum valve open time $T_{ON}$ during operation mode have been described in the presently preferred form, it will be apparent that the circuitry techniques employed may be varied or modified in accordance with techniques known in the art, and the invention is not limited to the particular circuitry described herein. Furthermore, it will be apparent that rearrangements and modifications may be made to the presently preferred mechanical portions of the present system described above by employing design techniques known in the art. It will also be understood that the electrical logic of the control signal system has been described with reference to discrete components; however, the components may be combined in integrated circuits using common power supply terminals and, in particular, the digital circuitry embodiments of FIGS. 14 and 16 may be combined in a single integrated circuit by known techniques.

The present invention thus provides a novel vehicle speed control system, or road speed regulator, which utilizes a servoactuator having a member alternating from an activating to a deactivating state to generate a fluid pressure control signal for energizing the vehicle throttle actuator. The preferred servoactuator further includes means for variably biasing the alternating member to the deactivating state in response to movement of the vehicle throttle actuator. Control is maintained by means responsive to deviation of vehicle speed from the predetermined set speed, and such control means is operable to vary the time that the alternating member is in the activating state during each period of alternation in accordance with a governing equation, thereby maintaining and controlling vehicle speed. Speed is sensed by a generator providing an electric signal output. The means for providing an electrical control signal for moving the oscillating means of the servoactuator for generating the fluid pressure control signal is of the electronic type and employs analog-digital circuitry in one embodiment and substantially all-digital circuitry in another embodiment. The present system thus utilizes a novel servo-actuator with direct mechanical throttle position sensing, yet enables the electrical control signal generating and speed sensing functions to be provided by all electrical means.

It will be apparent to those having ordinary skill in the art that the invention, although described herein in its preferred form, may be modified and varied from the form described, and is limited only by the following claims.

What is claimed is:

1. A device for maintaining a selected speed in a throttle controlled motor vehicle, said device comprising:
   means for sensing the substantially instantaneous value of the actual vehicle speeds;
   means for registering a selected value of said sensed vehicle speed to represent said selected speed;
   means for producing a control signal, one characteristic of which is varied in accordance with the value of $K_1 + K_2V_{SET} + K_3V_G$ where $K_1$, $K_2$ and $K_3$ are predetermined, non-zero constants with $K_2$ different from $K_3$, where $V_{SET}$ is said selected value, and $V_G$ is said substantially instantaneous value; and
   servoactuator means responsive to said varying characteristic to move said throttle for maintaining said selected speed.

2. The device defined in claim 1, wherein,
   (a) said means for sensing substantially the instantaneous value of vehicle speed includes (i) means operable to emit a series of pulses having the frequency thereof proportional to vehicle speed;

(b) a time source operable to establish successive time intervals, (c) a counter-responsive to said time source and operative to count said pulses for each of said time intervals; and, (d) first means operative to register said pulse count from one of said time intervals as said selected speed.

3. The device defined in claim 2, wherein said means for registering said sensed speed as said selected speed includes (a) means receiving said count from said counter and operative to register said count at a selected instant.

4. The device described in claim 1, wherein (a) said means sensing vehicle speed includes (i) means operable to emit a series of pulses having the frequency thereof proportional to actual vehicle speed, (ii) a time source operable to establish successive time intervals, (iii) a counter responsive to said time source and operative to count said pulses during said time intervals, (iv) first register means operative to register said pulse count from said counter during said time intervals as said substantially instantaneous value of vehicle speed; and, (b) said means for registering said sensed speed as said selected speed includes, (v) second register means receiving the output of said counter and operable to register said count at a selected instant as said selected speed.

5. The device defined in claim 4 wherein said first and second register means include shift register means receiving the count from said counter and shift out said count upon receipt of a command shift signal.

6. The device defined in claim 4, wherein said means for producing a control signal includes means receiving the output of said first and second register means and operable in response thereto to provide said varying characteristics of said control signal.

7. The device defined in claim 1, wherein said servoactuator means includes fluid pressure responsive actuator means.

8. The device defined in claim 1, wherein said means operable to emit a control signal includes means operable to generate a series of pulses having the width thereof proportional to the value of said sum.

9. The device defined in claim 1, wherein said servoactuator means includes means defining a fluid pressure chamber adapted for connection to a source of fluid pressure, means responsive to the pressure in said chamber and valve means movably responsive to said control signal to control the pressure in said chamber.

10. A device for maintaining a selected speed in a throttle controlled motor vehicle, said device comprising:

means for sensing the substantially instantaneous value of the actual vehicle speed;

means for registering a selected value of said sensed speed to represent said selected speed;

means for producing a control signal in accordance with said selected value and said instantaneous value;

servoactuator means responsive to said control signal to move said throttle for maintaining said selected speed;

means for manually actuating said registering means; and, means for providing a one-shot output signal of a predetermined duration to said servoactuator to move said throttle in a speed increasing direction in response to said manual actuating means.

* * * * *

UNITED STATES PATENT AND TRADEMARK OFFICE
CERTIFICATE OF CORRECTION

PATENT NO. : 4,072,206
DATED : 2/7/78
INVENTOR(S) : Gerald L. Larson; Alberto Pi; Martin W. Uitvlugt It is certified that error appears in the above-identified patent and that said Letters Patent are hereby corrected as shown below:

| | |
|---|---|
| Col. 3, line 36: | "returing" should read "returning". |
| Col. 7, line 64: | "betwen" should read "between". |
| Col. 8, line 29: | After "chamber" insert "12b". |
| Col. 12, line 23: | "analogdigital" should read "analog-digital". |
| Col. 13, lines 52-53: | "connected design dropping" should read "connected through dropping". |
| line 50: | "24g" should read "24j". |
| Col. 14, line 7: | "fivevolt" should read "five-volt". |
| line 57: | "45 1 miles per hour" should read "45 miles per hour". |
| Col. 16, line 55: | Delete the period after "52n" and insert a comma. |
| Col. 18, line 65: | "63fg" should read "68fg". |
| Col. 21, line 48: | "78av" should read "76av" |
| Col. 22, line 29: | "76dk" should read 76bk". |
| Col. 23, line 48: | "is" should read "it". |
| Col. 24, line 4: | "vechicle" should read "vehicle". |
| line 23: | "th" should read "the". |

UNITED STATES PATENT AND TRADEMARK OFFICE
CERTIFICATE OF CORRECTION

PATENT NO. : 4,072,206

DATED : 2/7/78

INVENTOR(S) : Gerald L. Larson; Alberto Pi; Martin W. Uitvlugt

It is certified that error appears in the above-identified patent and that said Letters Patent are hereby corrected as shown below:

| | |
|---|---|
| Col. 25, line 33: | "Q" should read "$\bar{Q}$" |
| line 41: | Before "conduct" "the" should read "to". |
| Col. 26, line 1: | "84b, 1 also" should read "84b, also". |
| line 53: | "92" should read "94". |
| Col. 28, line 27: | "valve" should read "value". |
| line 31: | "K'-K'" should read "K-K'" |
| line 36: | "V'-V'" should read "V-V'". |
| Col. 29 line 3: | Delete the period after "milliseconds". |

Signed and Sealed this

First Day of August 1978

[SEAL]

Attest:

RUTH C. MASON
*Attesting Officer*

DONALD W. BANNER
*Commissioner of Patents and Trademarks*